United States Patent
Hirosawa

(10) Patent No.: US 10,319,121 B2
(45) Date of Patent: Jun. 11, 2019

(54) ACOUSTIC PERFORMANCE CALCULATION DEVICE, ACOUSTIC PERFORMANCE CALCULATION METHOD, AND ACOUSTIC PERFORMANCE CALCULATION PROGRAM

(71) Applicant: NITTOBO ACOUSTIC ENGINEERING CO., LTD., Tokyo (JP)

(72) Inventor: Kunikazu Hirosawa, Tokyo (JP)

(73) Assignee: NITTOBO ACOUSTIC ENGINEERING CO., LTD., Sumida-ku, Tokyo (JP)

( * ) Notice: Subject to any disclaimer, the term of this patent is extended or adjusted under 35 U.S.C. 154(b) by 1120 days.

(21) Appl. No.: 14/361,931

(22) PCT Filed: Nov. 28, 2012

(86) PCT No.: PCT/JP2012/080708
§ 371 (c)(1),
(2) Date: May 30, 2014

(87) PCT Pub. No.: WO2013/080993
PCT Pub. Date: Jun. 6, 2013

(65) Prior Publication Data
US 2014/0340406 A1   Nov. 20, 2014

(30) Foreign Application Priority Data

Dec. 1, 2011   (JP) .................................. 2011-263645

(51) Int. Cl.
*G06G 7/48*   (2006.01)
*G06T 11/20*   (2006.01)
(Continued)

(52) U.S. Cl.
CPC ........... *G06T 11/206* (2013.01); *G01H 17/00* (2013.01); *G10K 11/16* (2013.01); *G10K 11/162* (2013.01); *H04R 29/00* (2013.01)

(58) Field of Classification Search
None
See application file for complete search history.

(56) References Cited

U.S. PATENT DOCUMENTS 6,256,600 B1    7/2001    Bolton et al.
6,958,950 B2 *  10/2005   Kim ........................ G03H 3/00
                                                              367/8

(Continued)

FOREIGN PATENT DOCUMENTS

JP    6-281516 A       10/1994
JP    2004-232354 A    8/2004
JP    2010-58538 A     3/2010

OTHER PUBLICATIONS

Nam, Kyoung-Uk, and Yang-Hann Kim. "A partial field decomposition algorithm and its examples for near-field acoustic holography." The Journal of the Acoustical Society of America 116.1 (2004): 172-185.*

(Continued)

*Primary Examiner* — Aniss Chad
*Assistant Examiner* — Nithya J. Moll
(74) *Attorney, Agent, or Firm* — Buchanan Ingersoll & Rooney PC

(57) ABSTRACT

The acoustic performance of acoustic materials is readily studied for various values of the material parameters characteristic of acoustic materials. An acoustic performance calculation device is provided with an acoustic performance calculation device that calculates the acoustic performance of acoustic materials for each of a plurality of values in a pre-specified numerical range for each of a plurality of material parameters characteristic of acoustic materials (Continued)

based on a mathematical model for mathematically representing acoustic material, a contour map drawing device for drawing a contour map representing the calculated acoustic performance by contours where the two axes are the values of one material parameter and the frequency, and a plot drawing device for plotting the performance curves showing the relationship between the frequency and the acoustic performance for one value in the numerical range.

15 Claims, 16 Drawing Sheets

(51) Int. Cl.
    *G01H 17/00*     (2006.01)
    *G10K 11/16*     (2006.01)
    *G10K 11/162*     (2006.01)
    *H04R 29/00*     (2006.01)

(56) References Cited

U.S. PATENT DOCUMENTS

| | | | | |
|---|---|---|---|---|
| 8,229,754 | B1* | 7/2012 | Ramirez | G11B 27/034 |
| | | | | 345/440 |
| 2005/0246167 | A1* | 11/2005 | Nakajima | G01S 3/8083 |
| | | | | 704/213 |
| 2009/0205901 | A1 | 8/2009 | Tanase et al. | |
| 2010/0150359 | A1* | 6/2010 | KnicKrehm | G01H 7/00 |
| | | | | 381/58 |
| 2012/0101748 | A1* | 4/2012 | Kobayashi | G01H 3/00 |
| | | | | 702/56 |

OTHER PUBLICATIONS

International Search Report (PCT/ISA/210) dated Mar. 12, 2013, by the Japanese Patent Office as the International Searching Authority for International Application No. PCT/JP2012/080708.

Hirosawa et al., "A numerical analysis by transfer matrix method applied Biot model for layered poroelastic material", vol. 2007, 2007, pp. 69-74.

Hirosawa et al., "Keyword de Miru Jidosha ni Motomerareteiru Zairyo Gijutsu Kyuon: Jidoshayo Kyushaon Zairyo no Sekkei to Koka no Kensho" Polyfile, May 10, 2012, vol. 49, No. 5, pp. 52-56.

Nakagawa, "On Acoustic Materials", Jun. 2003, 6 pages, http://www.noe.co.jp/technology/19/19meca3.html.

Nakagawa, "On Acoustic Material" (Part II), Jun. 2004, 6 pages, http://www.noe.co.jp/technology/21/21meca2.html.

Nakagawa, "On Acoustic Materials" (Part III), Jul. 2005, 7 pages, http://www.noe.co.jp/technology/22/22meca1.html.

* cited by examiner

FIG.1 "Related Art"
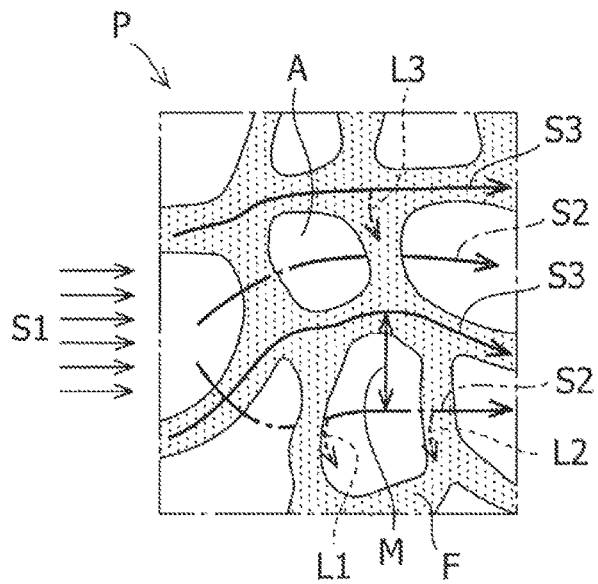
FIG.2
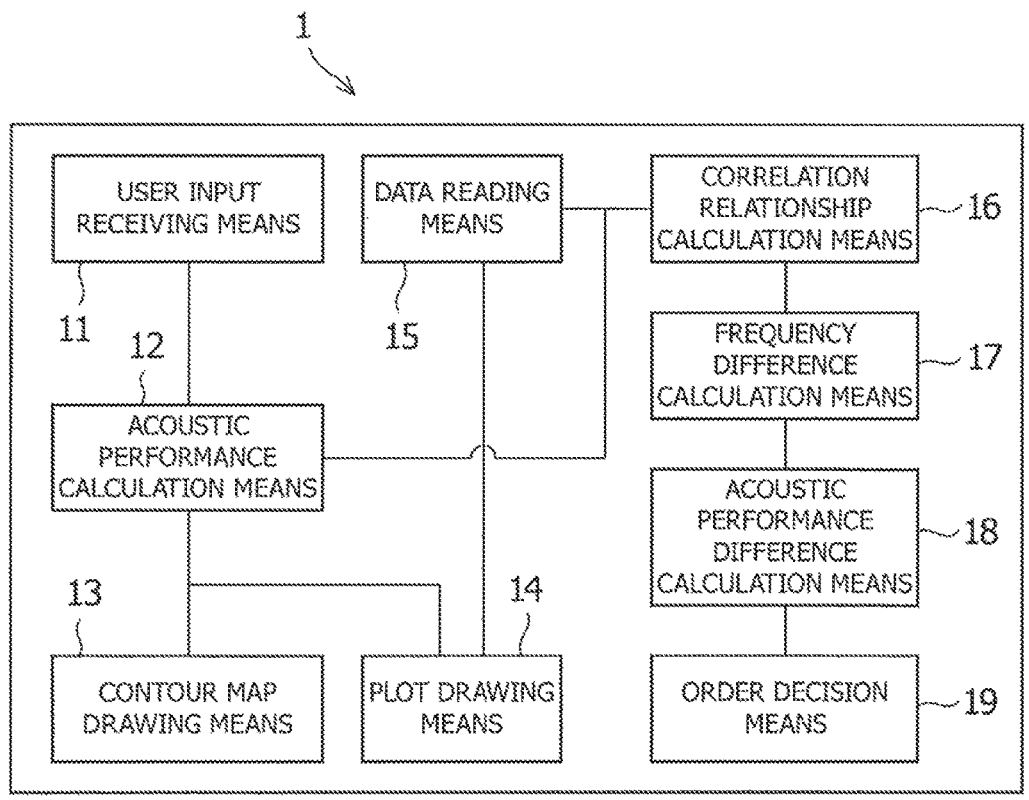

ACOUSTIC PERFORMANCE CALCULATION DEVICE, ACOUSTIC PERFORMANCE CALCULATION METHOD, AND ACOUSTIC PERFORMANCE CALCULATION PROGRAM

TECHNICAL FIELD

The present invention relates to an acoustic performance calculation device, an acoustic performance calculation method, and an acoustic performance calculation program.

BACKGROUND ART

"Quietness" is valued as a characteristic of various types of products, such as automobiles, office equipment, household electric appliances, and houses. In order to increase the quietness of such products, materials having actions, such as sound absorption and sound insulation, are often used. Such materials are referred to as "acoustic materials". An acoustic material may be constituted of a single material or of layered material, which includes layers of a plurality of materials laminated together.

The term "sound absorption" refers to the phenomenon in which sound incident to a material and is not reflected thereby and is absorbed or transmitted through the material. The performance of sound absorption is evaluated by a value such as sound absorption coefficient. The term "sound insulation" refers to the phenomenon in which sound incident to a material does not transmit through the material. The performance of sound insulation is evaluated by a value such as sound transmission loss. The sound absorption coefficient and the sound transmission loss are a function of the frequency, respectively. The sound absorption coefficient and the sound transmission loss are collectively referred to as "acoustic performance".

In developing acoustic materials, it is a general practice to actually prototype an acoustic material, actually measure the acoustic performance of the prototype material, verify whether desired results have been obtained as a result of the measurement, and repeat the prototyping and the actual measurement until desired results are obtained. However, costs for the material may increase due to the repeated prototyping. In addition, dedicated facilities may be required to actually measure the acoustic performance of the prototype material. Furthermore, the development time often becomes long due to the prototyping and the actual measurement that must be repeated.

Instead of the method in which prototyping and actual measurement are repeated, a method is used in which an acoustic material is mathematically represented as a mathematical model and the acoustic performance of the acoustic material is calculated according to the mathematical model. In this method, characteristics of a material that is to be modeled, such as the density and the thickness of the material, i.e., values of material parameters, are determined. The acoustic performance of the material is calculated based on the values. Several mathematical models are available and the mathematical model to be used differs according to the type of the material to be modeled. Furthermore, the type of the material parameter that becomes necessary differs according to the mathematical model. Of course, if the acoustic material is a layered material, different mathematical model can be used for different materials.

For example, in the case of modeling porous materials, such as glass wool, the equivalent fluid model, rigid frame model, Biot model, and the like are used. For impervious elastic materials, such as a steel plate, a model different from those described above is used. In particular, the Biot model is described in Non Patent Literatures 1 to 3.

Among the several mathematical models described above, the Biot model will be specifically described. FIG. 1 illustrates the propagation of sound inside an acoustic material P, which is assumed in the Biot model. The acoustic material P is a porous material and includes frames F, which are a solid having elasticity, and air A, which exists among the frames F. Sound S1, which has been incident to the above-described acoustic material P, propagates through the air A as air-borne sound S2 and through the frames F as structure borne sound S3. The energy of the air-borne sound S2 is lost due to viscous loss L1 and heat exchange loss L2 in relation to the frame F. In addition, the energy of the structure borne sound S3 is lost due to internal loss L3. Further, an interaction M occurs between the air-borne sound S2 and the structure borne sound S3, by which the structure borne sound S3 is activated by the air-borne sound S2.

On the basis of FIG. 1, the Biot model uses nine material parameters, which include: (1) porosity; (2) flow resistivity; (3) tortuosity; (4) a viscous characteristic length; (5) a thermal characteristic length; (6) density; (7) an internal loss coefficient; (8) a shear modulus; and (9) a Poisson's ratio.

Among the above-described material parameters, (1) the porosity, (2) the flow resistivity, (3) the tortuosity, (4) the viscous characteristic length, and (5) the thermal characteristic length are parameters related to a fluid property of the acoustic material P, i.e., the air-borne sound S2. More specifically, the porosity refers to a ratio of air in the acoustic material P. As the ratio of the air A becomes greater, the porosity of the acoustic material P becomes higher. Next, the flow resistivity is a numerical value that represents the difficulty of air flow in the acoustic material P. Because sound is the vibration of air, if the flow resistivity of the acoustic material P is high, it becomes difficult for the air to flow inside the acoustic material P. In this case, the acoustic material P can be considered to be a material in which sound does not propagate readily. The flow resistivity is very important among the material parameters. The tortuosity is a numerical value that represents the complexity of the shape of paths of air, which are formed by the air A. As the tortuosity becomes higher, the sound propagates through the material P for a longer path, which brings about better sound absorption. The viscous characteristic length and the thermal characteristic length are a numerical value that represents the level of the viscous loss L1 and the level of the heat exchange loss L2, respectively.

Furthermore, among the above-described material parameters, (6) the density, (7) the internal loss coefficient, (8) the shear modulus, and (9) the Poisson's ratio are parameters related to an elastic property of the acoustic material P, i.e., the structure borne sound S3.

By solving a wave equation that uses the above-described nine material parameters, the wavenumber and the characteristic impedance of acoustic waves transmitted through the acoustic material P are obtained. To specifically describe the wavenumber, in the Biot model, three waves, i.e., a fast longitudinal wave, a slow longitudinal wave, and a shear wave propagate through the acoustic material P. In other words, the wavenumber of each of the three waves is obtained. Next, with respect to the characteristic impedance, for each of the fast longitudinal wave and the slow longitudinal wave, the characteristic impedance in the air existing in the air A and the characteristic impedance in the frame F are obtained. For the shear wave, the characteristic impedance in the frame F is obtained because it propagates through the frame F only. More specifically, five characteristic impedances are obtained in total for the above-described three waves. According to the Biot model, the acoustic performance of the acoustic material P can be calculated by using the above-described three wavenumbers and the five characteristic impedances.

CITATION LIST

Non Patent Literature

Non Patent Literature 1: Hiroshi Nakagawa, On Acoustic Materials [online], June 2003 [retrieved on 2011-11-16], retrieved on the web site of Nittobo Acoustic Engineering Co., Ltd., from the Internet: <URL: http://www.noe.co.jp/technology/19/19meca3.html>

Non Patent Literature 2: Hiroshi Nakagawa, On Acoustic Materials (Part II) [online], June 2004 [retrieved on 2011-11-16], retrieved on the web site of Nittobo Acoustic Engineering Co., Ltd., from the Internet: <URL: http://www.noe.co.jp/technology/21/21meca2.html>

Non Patent Literature 3: Hiroshi Nakagawa, On Acoustic Materials (Part III) [online], July 2005 [retrieved on 2011-11-16], retrieved on the web site of Nittobo Acoustic Engineering Co., Ltd., from the Internet: <URL: http://www.noe.co.jp/technology/22/22meca1.html>

SUMMARY OF INVENTION

Technical Problem

As described above, in order to model an acoustic material according to a mathematical model such as the Biot model and calculate the acoustic performance of the modeled acoustic material, it is necessary to determine material parameters that are characteristic of the acoustic material. Although it can be considered to actually measure and use the values of the material parameters, a relatively superior measurement technique is required for actual measurement. However, some material parameters exist which cannot be measured according to the type of the acoustic material. In addition, it is complicated and difficult to verify whether values of material parameters obtained by actual measurement correctly represent the characteristics of the acoustic material.

Therefore, in order to calculate the acoustic performance of an acoustic material based on a mathematical model, it is necessary to determine values of a plurality of material parameters required in the mathematical model by specific means such as estimation or actual measurement. The acoustic performance is calculated according to the mathematical model based on the values of the plurality of material parameters determined in the above-described manner. If a desired acoustic performance is not obtained by the calculation, the acoustic performance is calculated again based on changed material parameter values. However, it is difficult to predict what values are to be set on material parameters to obtain a desired acoustic performance. To paraphrase this, it is necessary to repeatedly determine the values of the material parameters and the calculation of the acoustic performance based on the determined values. As a result, the process may become complicated and it may take a very long time to complete the calculation.

As described above, the purpose of the disclosure of the present application is to provide a method that enables easy study of the acoustic performance of an acoustic material for various values of material parameters that are characteristic of the acoustic material.

Solution to Problem

In order to achieve the above-described purpose, an acoustic performance calculation device disclosed in the present application is configured to calculate acoustic performances of an acoustic material for each of a plurality of values existing within a pre-specified numerical range for one type among a plurality of material parameters characteristic of the acoustic material based on a mathematical model for mathematically representing the acoustic material; configured to draw a contour map, which represents the calculated acoustic performance by contours with different colors differing according to values of the acoustic performance by using the values of the one type material parameter and a frequency as values taken on two axes; configured to draw, on the contour map, a straight line-shaped cursor parallel to a frequency axis of the contour map and a display of the value of the one type material parameter indicated by the cursor; configured to draw performance curves which represent a relationship between the frequency and the acoustic performance for one value within the numerical range on a plot; configured to change a position of display of the cursor on the contour map and a display of the value of the one type material parameter according to a user input; and configured to draw performance curves corresponding to the display of the changed value of the one type material parameter on the plot.

In order to achieve the above-described purpose, another aspect of the acoustic performance calculation device disclosed in the present application is configured to calculate acoustic performances of an acoustic material based on respective values of a plurality of material parameters characteristic of the acoustic material based on a mathematical model which mathematically represents the acoustic material; configured to determine an evaluation function by which one specific selected material parameter is to be optimized, based on a relationship between the calculated acoustic performances and another acoustic performance for comparison; and configured to calculate an optimum solution for the one specific selected material parameter by solving an optimization problem for minimizing or maximizing the determined evaluation function by using a specific optimization method. Determination of the evaluation function and calculation of optimum solutions are executed for each of the plurality of material parameters.

Advantageous Effect of Invention

According to the disclosure of the present application, it is enabled to readily study the acoustic performance of an acoustic material for various values of material parameters that are characteristic of the acoustic material.

BRIEF DESCRIPTION OF DRAWINGS

FIG. 1 is an explanatory drawing that illustrates the propagation of sound inside an acoustic material.

FIG. 2 is an explanatory drawing that illustrates an exemplary functional configuration of an acoustic performance calculation device.

DESCRIPTION OF EMBODIMENTS

[Acoustic Performance Calculation Device]

Figure 3:
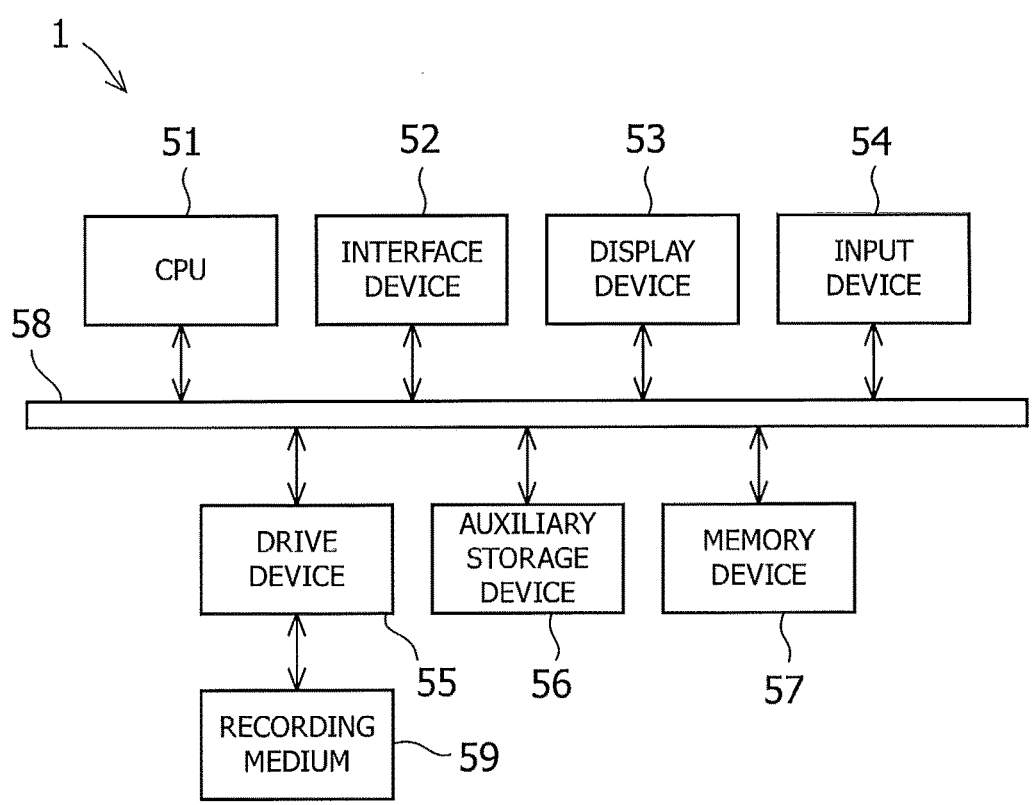
FIG. 3 is an explanatory drawing that illustrates an exemplary hardware configuration of the acoustic performance calculation device.

FIG. 2 illustrates an exemplary functional configuration of an acoustic performance calculation device 1. The acoustic performance calculation device 1 includes: a user input receiving means 11; an acoustic performance calculation means 12, which is configured to calculate an acoustic performance according to a user input received by the user input receiving means 11; a contour map drawing means 13 configured to draw results of the calculation; and a plot drawing means 14 configured to draw the results of the calculation. Furthermore, the acoustic performance calculation device 1 includes a data reading means 15 configured to read data related to the acoustic performance from an outside. In addition, the acoustic performance calculation device 1 includes: a correlation relationship calculation means 16; a frequency difference calculation means 17; an acoustic performance difference calculation means 18; and an order decision means 19, which are configured to operate based on outputs from the acoustic performance calculation means 12 and the data reading means 15. Functions of the respective means will be described in detail below.

FIG. 3 illustrates an exemplary hardware configuration of the acoustic performance calculation device 1. The acoustic performance calculation device 1 includes a central processing unit (CPU) 51, an interface device 52, a display device 53, an input device 54, a drive device 55, an auxiliary storage device 56, and a memory device 57, which are mutually connected via a bus 58.

A program that implements the functions of the acoustic performance calculation device 1 is provided by a recording medium 59, such as a compact disc-read only memory (CD-ROM). When the recording medium 59, on which the program has been recorded, is set to the drive device 55, the program is installed from the recording medium 59 to the auxiliary storage device 56 via the drive device 55. It is not required to install the program by means of the recording medium 59. That is, alternatively, the program can be downloaded from other computers via a network. The auxiliary storage device 56 stores the installed program in addition to necessary files and data.

If an instruction for starting the program has been input, the memory device 57 reads the program from the auxiliary storage device 56 and stores the same. The CPU 51 implements the function of the acoustic performance calculation device 1 according to the program stored on the memory device 57. The interface device 52 is used as an interface for connection with other computers via a network. The display device 53 displays a graphical user interface (GUI) and the like provided by the program. The input device 54 includes a keyboard, a mouse, and the like.

[Processing I Executed by the Acoustic Performance Calculation Device]

Figure 4:
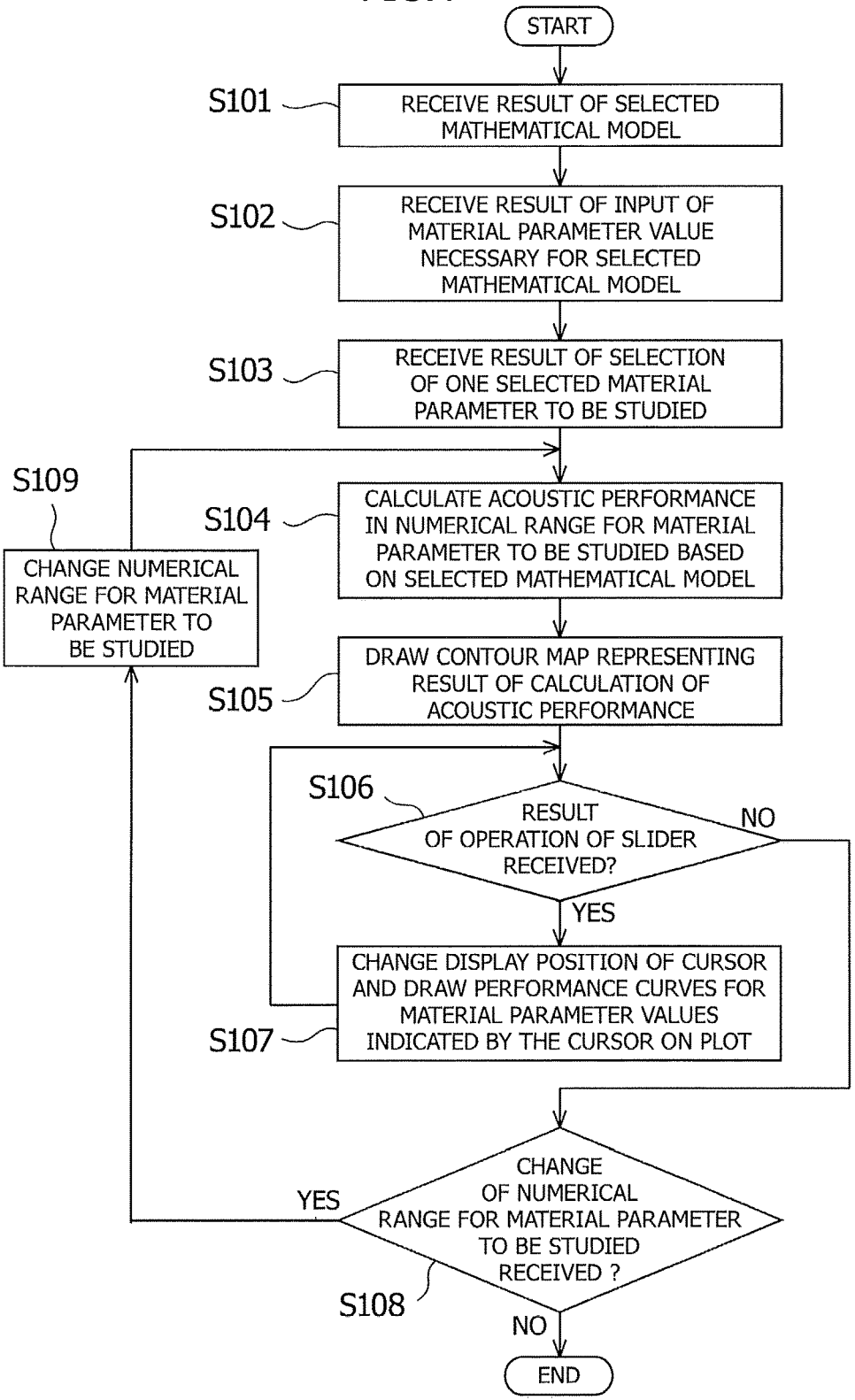
FIG. 4 is a flow chart of processing executed by the acoustic performance calculation device.

FIG. 4 illustrates a flow of processing executed by the acoustic performance calculation device 1 in determining values of the material parameters that correspond to a desired acoustic performance.

In step S101, the user selects a mathematical model for a single material or materials constituting a layered material for which the acoustic performance is to be calculated and the user input receiving means 11 receives a result of the selection. In the present embodiment, the acoustic material for which the acoustic performance is to be calculated is a layered material including glass wool layers and air spaces laminated together, for example. Suppose here that the Biot model has been selected for the glass wool layer and an air space model has been selected for the air space.

In step S102, the user temporarily determines values of the material parameters necessary for the mathematical model selected in step S101 and the user input receiving means 11 receives the input of the values by the user.

In step S103, the user selects one material parameter to be studied, among the material parameters necessary for the selected mathematical model, and the user input receiving means 11 receives the result of the selection. At the same time, the acoustic performance calculation means 12 previously designates a numerical range for the selected one material parameter. The numerical range is specified regardless of the temporary value of the material parameter received by the user input receiving means 11 in step S102. The term "study" used herein refers to the determination of specific values of the material parameters that are necessary to achieve a desired acoustic performance.

If the acoustic material to be studied is the above-described layered material including glass wool layers and air spaces, the flow resistivity of the glass wool layer to which the Biot model has been applied is selected as the material parameter to be studied, for example, and the user input receiving means 11 receives the result of the selection. At the same time, the acoustic performance calculation means 12 previously designates "from 1000.0 to 1.0 e+007" as the numerical range for the flow resistivity (unit: N·s/m$^4$). Note that the letter "e" represents powers of 10. In the above-described example, the term "1.0 e+007" means "1.0×10$^7$".

In step S104, the acoustic performance calculation means 12 calculates the acoustic performance for the specified numerical range for the material parameter that has been selected as the parameter to be studied according to the mathematical model selected in step S101. More specifically, the acoustic performance calculation means 12 selects 100 values, for example, at equal intervals within the specified numerical range for the material parameter, and in addition, selects 100 values, for example, at equal intervals within the numerical range "from 100.0 to 1.0 e+004" for the frequency. In this case, the acoustic performance calculation means 12 calculates 100×100=10,000 acoustic performance values. In calculating the acoustic performance, values become necessary for other material parameters that have not been selected as parameters to be studied. For these values, the values received in step S102 are used. The acoustic performance to be calculated can be either one or both of the sound absorption coefficient and the sound transmission loss. In the present embodiment, it is supposed that the sound absorption coefficient has been calculated, for example. The numbers of values such as 100 or 10,000 are mere examples, of course.

Figure 5:
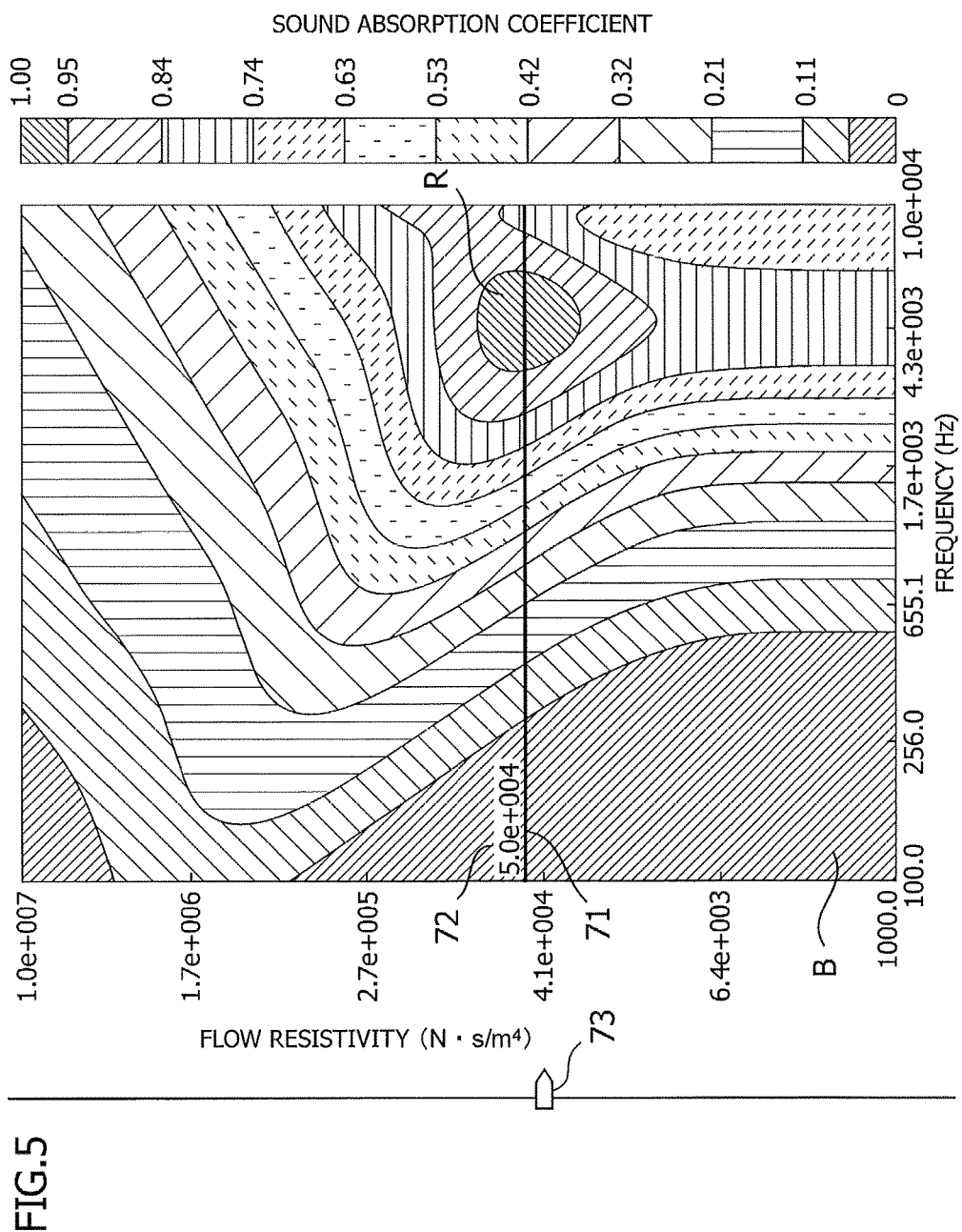
FIG. 5 illustrates an example of a contour map.

In step S105, the contour map drawing means 13 draws a contour map that illustrates the acoustic performance calculated by the acoustic performance calculation means 12 with contours by using the values of material parameters and the frequency of the acoustic material as values taken on two axes and displays the drawn contour map on the display device 53. An example of this contour map is illustrated in FIG. 5. The contour map illustrated in FIG. 5 illustrates the sound absorption coefficient in contours, in which the frequency is taken on the axis of the abscissa and the flow resistivity, which is one of the material parameters, is taken on the axis of the ordinate. The contour map is displayed by color according to the value of sound absorption coefficient. However, in FIG. 5, the regions are represented by a plurality of types of half-tone dot meshes instead of colors. For example, a region represented by a sign R is a region in which the sound absorption coefficient is in the range of 0.95 to 1.00 and is displayed in red. In addition, a region represented by a sign B is a region in which the sound absorption coefficient is in the range of 0 to 0.11 and is displayed in blue. Further, regions in which the sound absorption coefficient is in the range of 0.11 to 0.95 are displayed by color so that the hue gradually changes from red-based colors to blue-based colors as the sound absorption coefficient becomes smaller.

In addition, the contour map drawing means 13 displays a straight line-shaped cursor 71, which is parallel to the axis of the abscissa for the frequency and corresponding to the value of the flow resistivity taken on the axis of the ordinate, on the contour map. Further, the contour map drawing means 13 displays a display 72 of the value of the material parameter represented by the cursor 71 on the contour map. In FIG. 5, the cursor 71 displays the value of flow resistivity "5.0 e+004" as in the display 72.

As illustrated in FIG. 5, the contour map drawing means 13 draws a slider 73 on the left side of the contour map. The user can move the cursor 71 by moving the slider 73 by operating the input device 54 in the direction of the axis of ordinate of the contour map.

In step S106, the user input receiving means 11 determines whether a result of the user operation of the slider 73 has been received. If the result of the determination is "YES", then the processing advances to step S107.

In step S107, the contour map drawing means 13 changes the display position of the cursor 71 and also changes the display 72 of the value of the material parameter in the display position. Subsequently, the plot drawing means 14 draws, on a plot, a performance curve which represents a relationship between the frequency and the acoustic performance at the value of the material parameter represented by the display 72 of the changed value of the material parameter. To elaborate, one performance curve is drawn by the plot drawing means 14 for one value selected by the user from among the values of the material parameter in the above-described range. This performance curve is drawn on the basis of the mathematical model selected in step S101.

Figure 6:
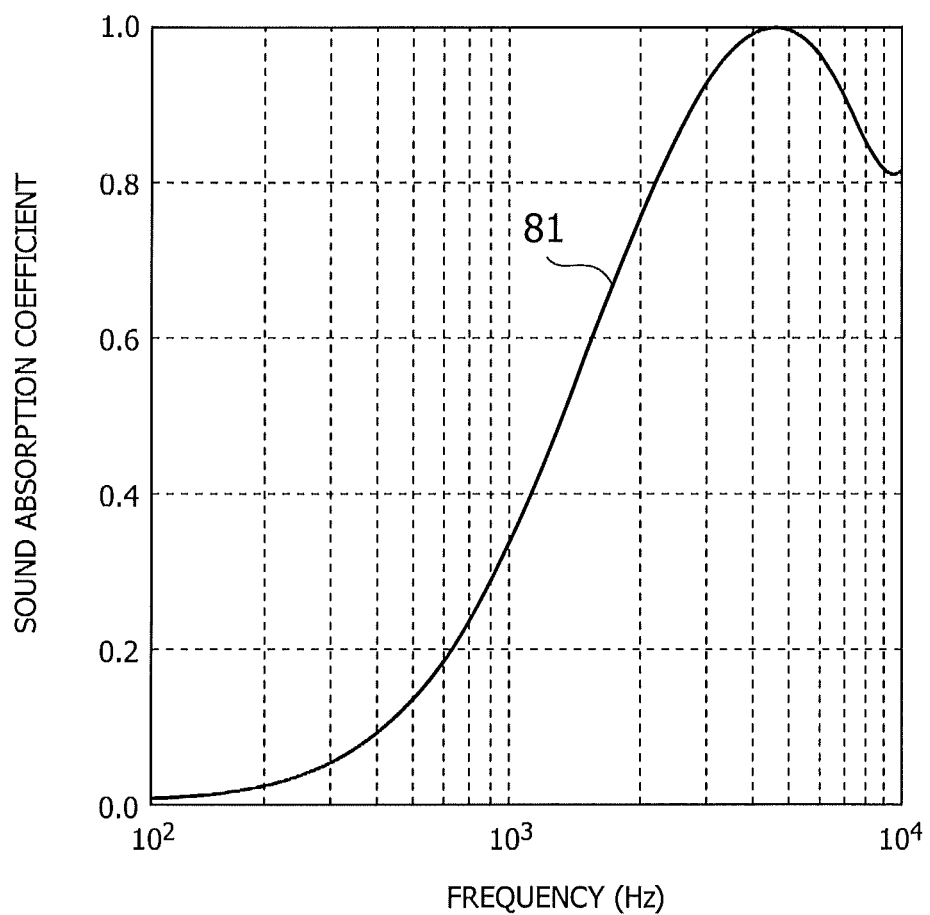
FIG. 6 illustrates an example of a plot.

An example of this plot is illustrated in FIG. 6. In the plot illustrated in FIG. 6, a performance curve 81 is shown, which represents the relationship between the frequency and the acoustic performance when the flow resistivity displayed by the display 72 (FIG. 5) is "5.0 e+004".

In this step, the user can appropriately move the cursor 71 on the display device 53. For example, the user can move the cursor 71 to a position at which it crosses the region shown by the sign R. The specific value of the material parameter indicated by the cursor 71 after the moving can be known by referring to the display 72. At the same time, the user can verify the performance curve for the value of the material parameter represented by the display 72 by referring to the plot.

After step S107 described above is completed, the processing returns to step S106. If the result of the determination in step S106 is "NO", then the processing advances to the subsequent step S108.

If it is determined by the user that the material parameter for achieving the desired acoustic performance does not exist within the specified numerical range after the user has verified the contour map illustrated in FIG. 5, the user can reset the numerical range for the material parameter by operating the input device 54. In step S108, the user input receiving means 11 determines whether resetting of the numerical range for the material parameter to be studied has been input.

If the result of the determination in step S108 is "YES", then in step S109, the acoustic performance calculation means 12 resets the numerical range for the material parameter to be studied. Subsequently, steps S104 to S108 are repeated. If the result of the determination in step S108 is "NO", the processing ends.

The user can determine the value of the material parameter to achieve the desired acoustic performance in the above-described manner. To describe this with reference to the example illustrated in FIG. 5, it is known, according to the cursor 71 and display 72, that in order to obtain the sound absorption coefficient of 0.95 to 1.00 when the frequency is "4.3 e+003 Hz", the value of the flow resistivity may be set at "5.0 e+004 (N·s/m$^4$)".

According to the present embodiment, the contour map and the plot can be displayed in the above-described manner. Further, by operating the slider, the user is allowed to study the change of the acoustic performance, which depends on the value of the material parameter to be studied. At the same time, the user can verify the details of the acoustic performance corresponding to a specific value of the material parameter to be studied by referring to the plot.

Furthermore, because the slider, the cursor for the material parameter to be studied, and a specific value thereof are displayed, the user can precisely and quantitatively determine the value of the material parameter to be studied.

In addition, according to the present embodiment, because the numerical range for the material parameter to be studied is previously specified and then the acoustic performances are correctively calculated in step S104 for the entire numerical range, it becomes unnecessary to recalculate the acoustic performance every time the values of the material parameter to be studied are modified. To describe this from the viewpoint of the user of the acoustic performance calculation device 1, because no recalculation is executed when the user operates the slider 73 to move the cursor 71 to the position at which the desired acoustic performance is obtained, the user is allowed to immediately know the material parameter value indicated by the cursor 71 after the moving without any waiting time.

According to the present embodiment, the value of the material parameter that enables the improvement of the acoustic performance of the acoustic material to be studied can be quantitatively obtained. Accordingly, a development policy of the acoustic material can be readily determined. Furthermore, because the study is performed based on mathematical models, it is not necessary to actually produce prototypes. Therefore, development costs for the acoustic materials can be reduced.

[Processing II Executed by the Acoustic Performance Calculation Device]

Figure 7:
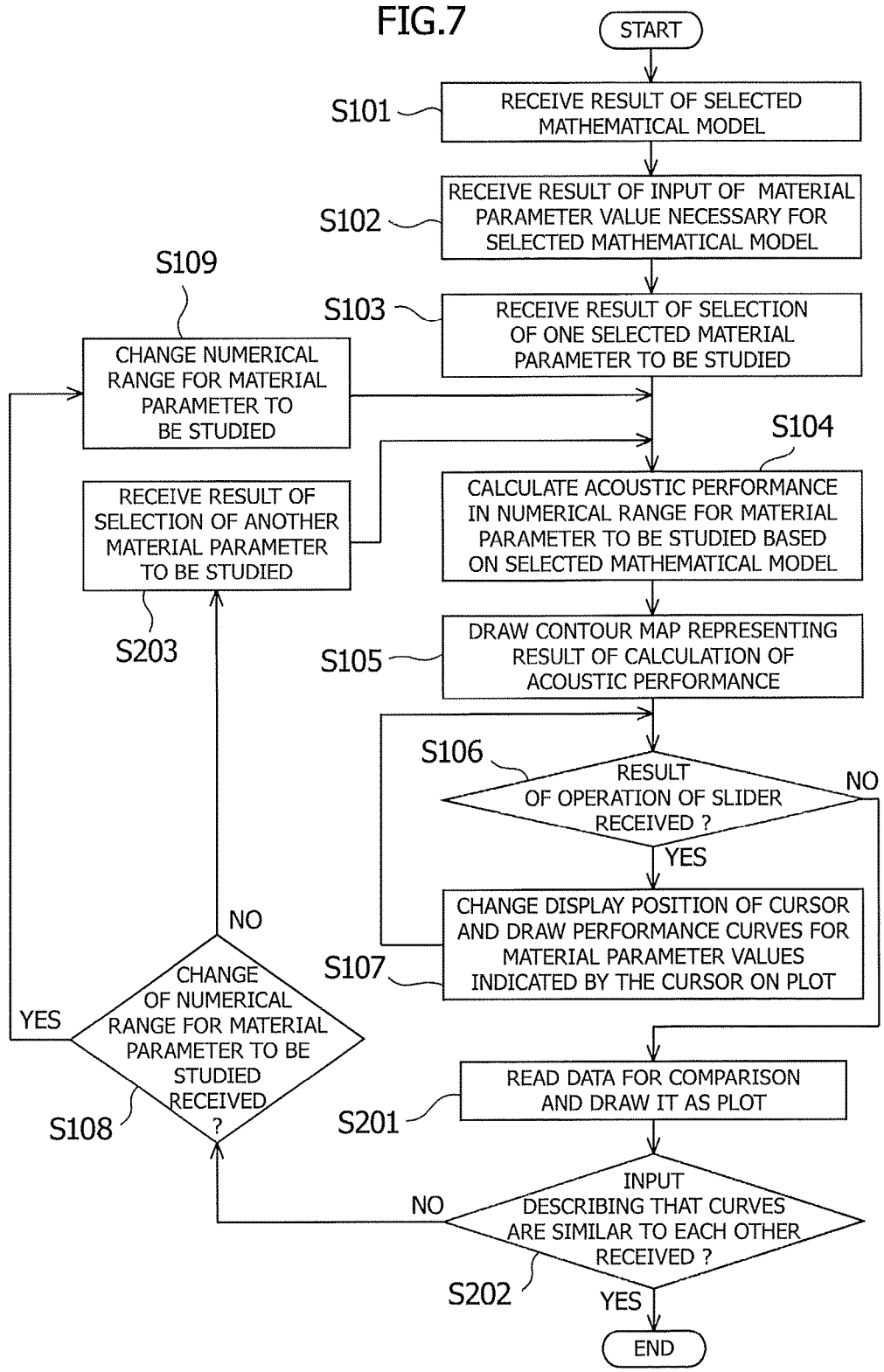
FIG. 7 is a flow chart of another processing executed by the acoustic performance calculation device.

FIG. 7 illustrates a flow of processing executed by the acoustic performance calculation device 1, in which the acoustic performance of an acoustic material is calculated according to a mathematical model, the result of the calculation is compared with the acoustic performance obtained by actual measurement for the acoustic material, and values of the material parameters for acoustic materials are determined according to the mathematical model. Processes in steps that are similar to those in FIG. 4 are provided with the same signs.

Figure 8:
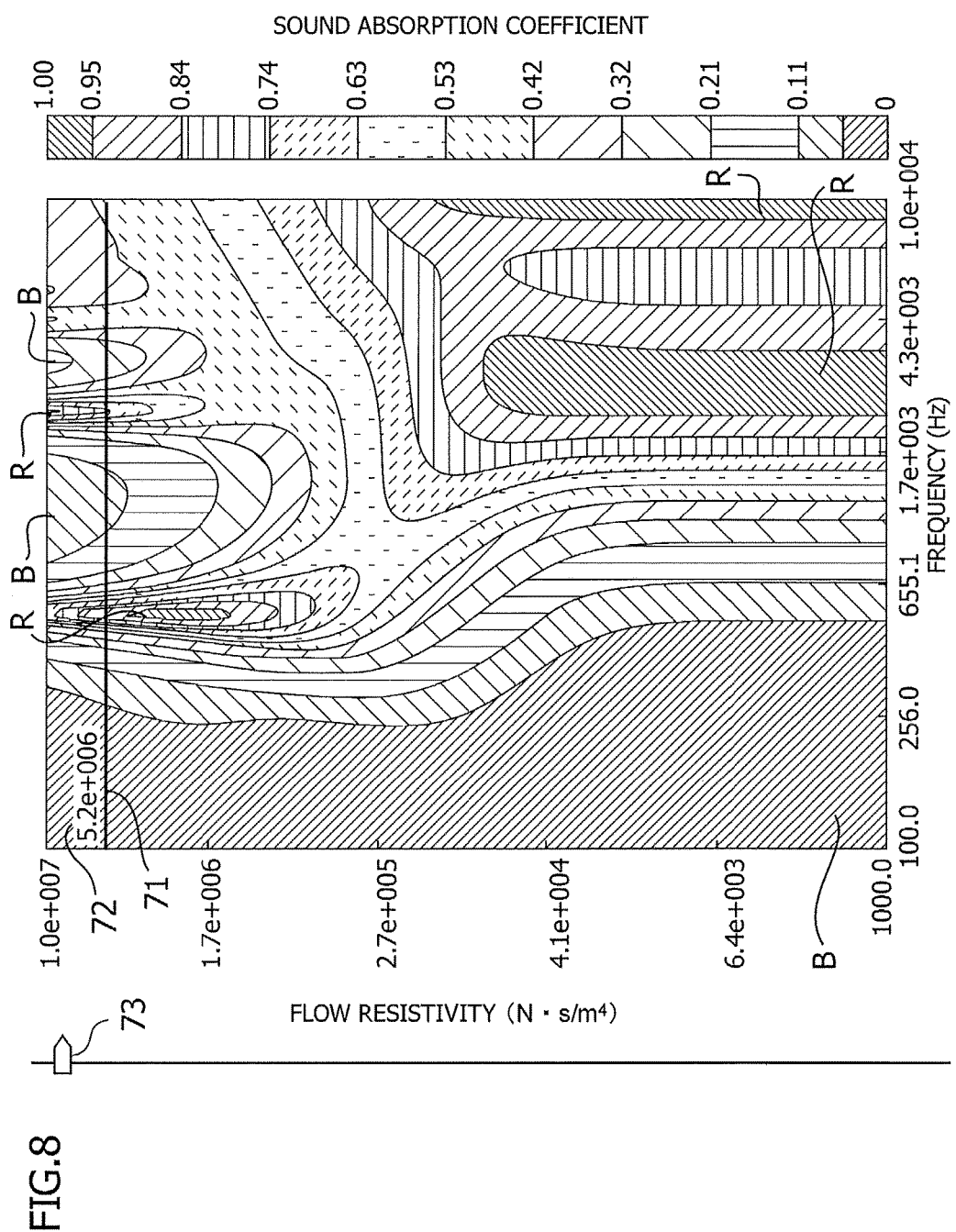
FIG. 8 illustrates another example of the contour map.

Steps S101 to S107 are as described above with reference to FIG. 4. Another example of the contour map displayed in step S105, among these steps, is illustrated in FIG. 8. In step S107, a performance curve 82 is displayed, which represents the relationship between the frequency and the acoustic performance at the value "5.2 e+006" of the flow resistivity indicated by a display 72 in FIG. 8. In other words, the performance curve 82 is based on the mathematical model.

Figure 9:
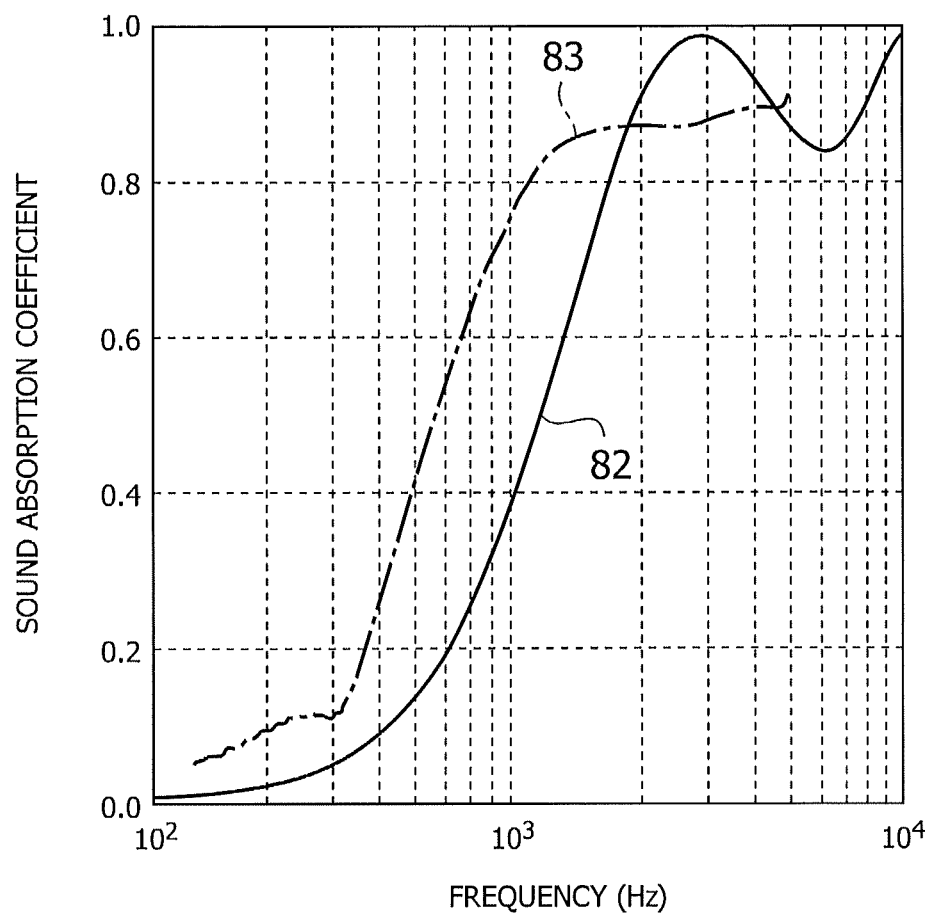
FIG. 9 illustrates another example of the plot.

In step S201, the data reading means 15 reads the actual measurement data of the acoustic performance as data for comparison. Subsequently, the plot drawing means 14 displays a plot on the display device 53 according to a result of the reading. An example of the actual measurement data of acoustic performance for comparison is illustrated in FIG. 9 as a performance curve 83. In other words, the performance curve 83 is based on the actual measurement.

Next, the user compares the mathematical model-based performance curve 82 and actual measurement-based performance curve 83 and operates the input device 54 to input the result of the determination as to whether the curves are similar to each other to the acoustic performance calculation device 1. In step S202, the user input receiving means 11 receives the input result. If an input result that denotes that they are not similar to each other, then the processing advances to step S108. Otherwise, the processing ends.

If the result of the determination in step S108 is "YES", then step S109, steps S104 to S107, and steps S201 and S202 are repeated. If the result of the determination in step S108 has become "NO" as a result of this, then the processing advances to step S203.

In step S203, the user input receiving means 11 receives the result of the selection of another material parameter to be studied. For example, if the material parameter "flow resistivity" has been specified to be studied so far, another material parameter "density" can be selected in this step. Then steps S104 to S107, steps S201 and S202, and step S108 are repeated. Finally, the result of the processing in step S202 becomes "YES" and the processing ends.

The user can determine the value of the material parameter to achieve the desired acoustic performance in the above-described manner. In the present embodiment, it is known, based on the contour map in FIG. 8 and the plot in FIG. 9, that in order to achieve an acoustic performance close to the actually measured acoustic performance of the acoustic material on the acoustic performance based on the mathematical model, the value of the flow resistivity may be set at "5.2 e+006 (N·s/m$^4$)".

According to the present embodiment, because the comparison between the actual measured value of the acoustic performance and the calculation value of the acoustic performance calculated based on the mathematical model can be readily visually performed, the value of the material parameter corresponding to the actual measured value can be obtained. The material parameter value can of course be actually measured. However, special facilities are required for this actual measurement. The present embodiment is advantageous in this point because it is enabled to obtain material parameter values by calculation instead of actual measurement. In addition, the present embodiment is useful also in studying the probability of the material parameter value obtained by the measurement.

[Processing III Executed by the Acoustic Performance Calculation Device]

Figure 10:
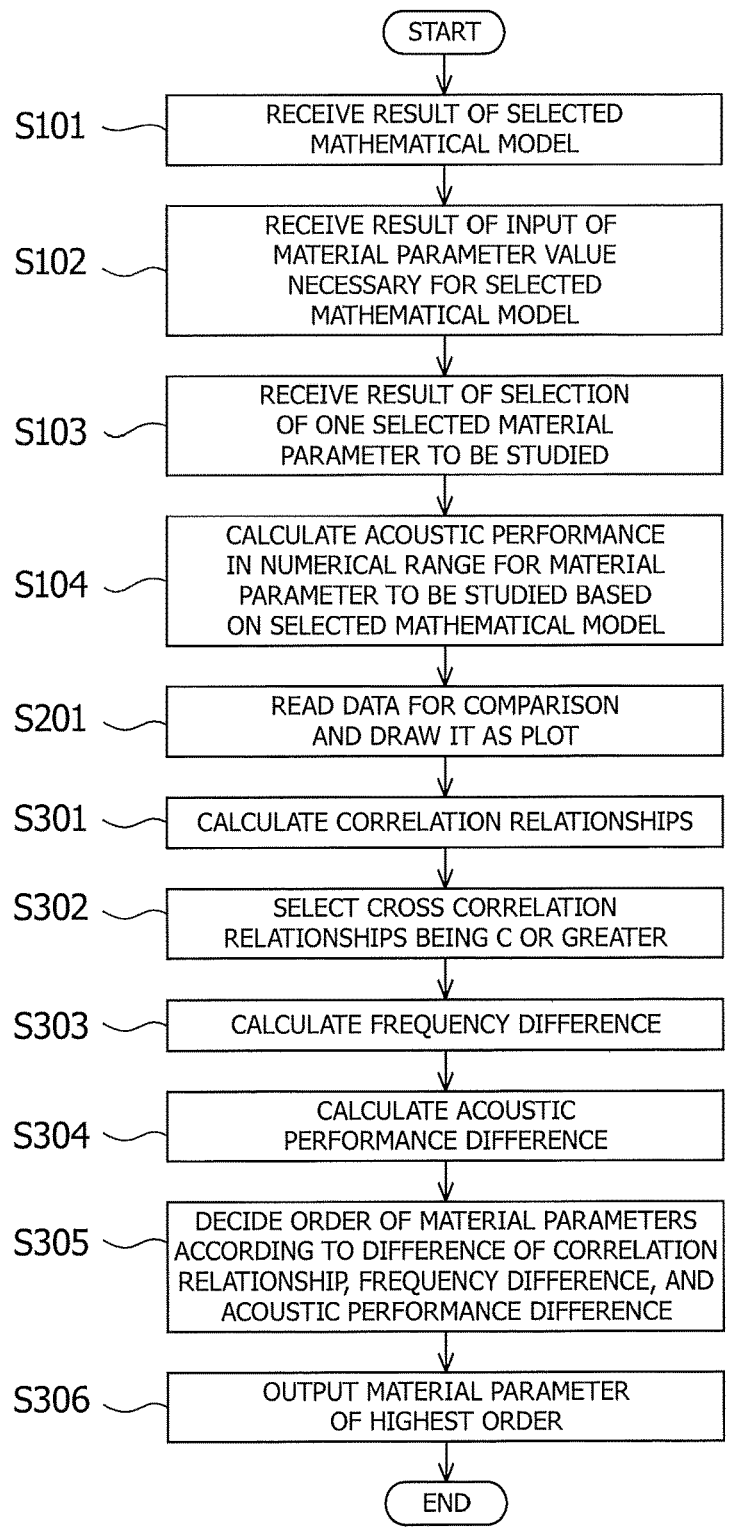
FIG. 10 is a flow chart of yet another processing executed by the acoustic performance calculation device.

FIG. 10 illustrates another exemplary flow of processing executed by the acoustic performance calculation device 1, in which the acoustic performance of an acoustic material is calculated according to a mathematical model, the result of the calculation is compared with the acoustic performance obtained by actual measurement for the acoustic material, and values of the material parameters for acoustic materials are determined according to the mathematical model. Processes in steps that are similar to those in FIG. 7 are provided with the same signs.

Steps S101 to S104 and step S201 are as described above with reference to FIG. 7.

Figure 11:
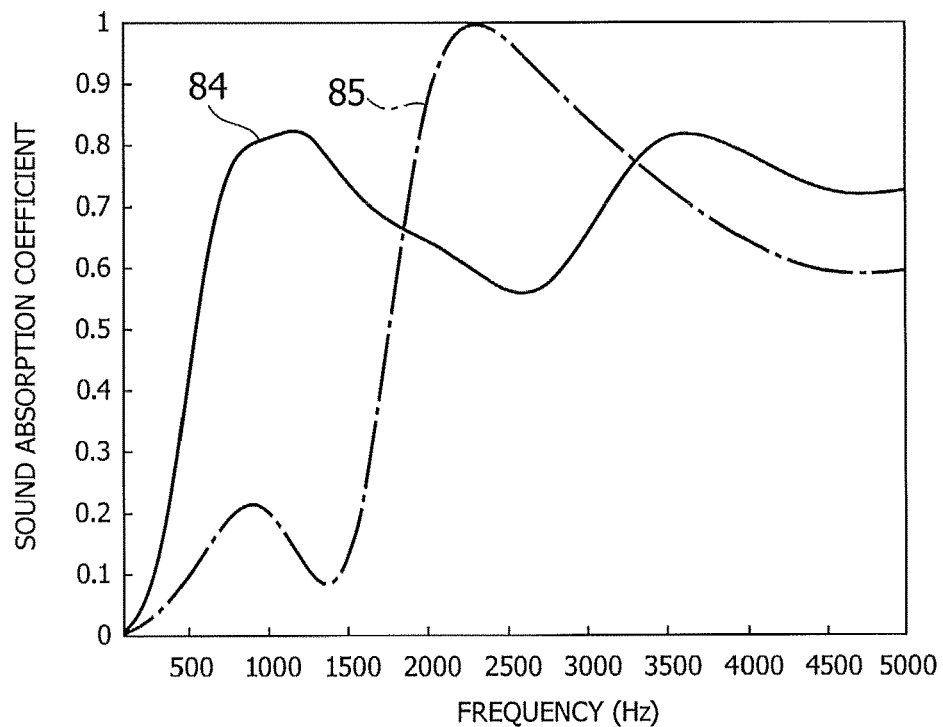
FIG. 11 illustrates yet another example of the plot.

In step S301, the correlation relationship calculation means 16 calculates a plurality of correlation relationships between a mathematical model-based performance curve 84 and an actual measurement-based performance curve 85 as illustrated in FIG. 11. Examples of the correlation relationships include cross correlation functions and correlation coefficients. Either one or both of them can be calculated where necessary. In the present embodiment, the cross correlation function only is calculated. If 100 material parameter values exist within the numerical range specified in step S103, then 100 mathematical model-based performance curves 84 exist. Accordingly, the correlation relationship calculation means 16 calculates 100 cross correlation functions for a relationship among 100 mathematical model-based performance curves 84 and one actual measurement-based performance curve 85.

Figure 12:
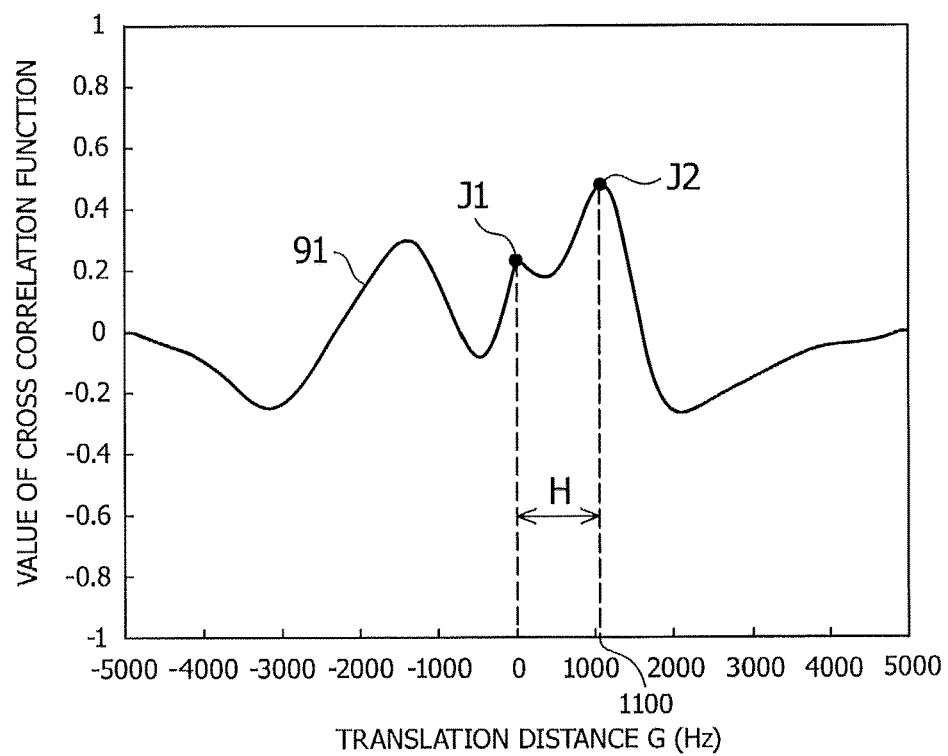
FIG. 12 is a graph that illustrates a relationship between a translation distance and a value of a cross correlation function.

One of 100 cross correlation functions calculated by the correlation relationship calculation means 16 of 100 is illustrated in FIG. 12 as a cross correlation function 91. Referring to FIG. 12, a translation distance G (unit: Hz) is taken on the axis of abscissa and a value of the cross correlation function is taken on the axis of ordinate. The value of the cross correlation function represents the similarity between the shape of the mathematical model-based performance curve 84 and the shape of the actual measurement-based performance curve 85. In the cross correlation function 91, the value of the cross correlation function becomes maximum at a point J2. The translation distance G is 1,100 Hz and the value of the cross correlation function is 0.47343 at the point J2. The point of maximum cross correlation function value J2 and its translation distance of 1,100 Hz show that if the mathematical model-based performance curve 84 is translated in relation to the frequency axis by the translation distance of 1,100 Hz towards the right of the frequency axis in FIG. 11, the translated performance curve 84 becomes most similar to the actual measurement-based performance curve 85. However, if the point J2 exists to the left of a point J1, which represents a value of the cross correlation function and for which the translation distance G is 0 Hz, the translation distance G is described with a negative value.

In step S302, the correlation relationship calculation means 16 selects cross correlation functions of which the maximum value is equal to or greater than a given real constant C from among 100 cross correlation functions calculated in step S301 and stores the selected cross correlation functions on the memory device 57. The real constant C is from 0 to 1 inclusive and a specific value thereof is previously received by the user input receiving means 11. Note that as the cross correlation function or the correlation coefficient becomes closer to 1, the shapes of both performance curves become more similar to each other. Furthermore, as the cross correlation function or the correlation coefficient becomes closer to 0, the shapes of both performance curves become more dissimilar to each other. For example, suppose that 20 cross correlation functions of which the maximum value is equal to or greater than the given real constant C have been selected in this step. In correspondence to this, 20 mathematical model-based performance curves 84 exist. In other words, 20 material parameter values exist. Steps subsequent to this will be described by using the number of "20" as an example.

In step S303, the frequency difference calculation means 17 calculates 20 frequency differences between the mathematical model-based performance curve 84 and the actual measurement-based performance curve 85. The "frequency difference" will be described by referring to FIG. 12 again. As described above, the translation distance G by which the cross correlation function 91 becomes maximum is 1,100 Hz. In this step, the frequency difference calculation means 17 calculates the translation distance G by which the value of the cross correlation function 91 becomes maximum as a frequency difference H. To paraphrase this, the frequency difference H is 1,100 Hz. Because 20 cross correlation functions have been selected in step S302, 20 frequency differences H are calculated.

More specifically, in step S303, the frequency difference calculation means 17 determines the frequency difference H, which is calculated according to the translation distance G by which the cross correlation function becomes maximum, on the basis of the cross correlation function between the mathematical model-based performance curve 84 and the actual measurement-based performance curve 85 calculated by the correlation relationship calculation means 16. In this step, 20 frequency differences H described above are calculated.

Figure 13:
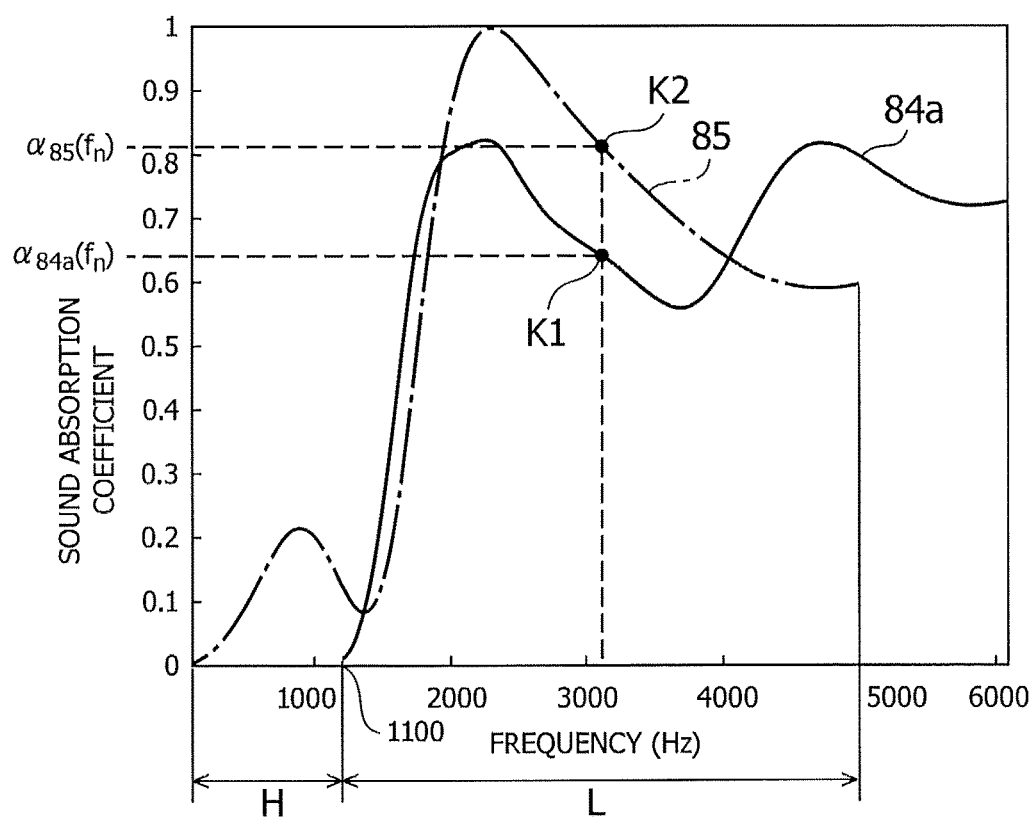
FIG. 13 is a plot that illustrates a translated performance curve.

In step S304, the acoustic performance difference calculation means 18 translates the mathematical model-based performance curve 84 by an amount equivalent to the frequency difference H calculated in step S303. The translated performance curve is a performance curve 84a illustrated in FIG. 13. Subsequently, 20 acoustic performance differences D are calculated, which are differences between the performance curve 84a obtained by translating the mathematical model-based performance curve 84 and the actual measurement-based performance curve 85.

The acoustic performance difference D will be described in detail. As described above, the correlation of the performance curve 84a, which is obtained by translating the performance curve 84 by an amount equivalent to the frequency difference H (i.e., 1,100 Hz), is the highest in relation to the performance curve 85. A frequency band in which the performance curve 84a and the performance curve 85 exist will be referred to as a "band L". In this example, the band L ranges from 1,100 Hz to 5,000 Hz. Points on the performance curve 84a and the performance curve 85 at a specific value of frequency within the band L are taken as a point K1 and a point K2, respectively. The sound absorption coefficient at the point K1 is $\alpha_{84a}(f_n)$ and the sound absorption coefficient at the point K2 is $\alpha_{85}(f_n)$. N values of frequency values are selected from the band L at equal intervals, for example. A value $|\alpha_{85}(f_n) - \alpha_{84a}(f_n)|$ is calculated for each of the N frequency values. A mean value of the total sum thereof is referred to as an "acoustic performance difference D". To elaborate, the acoustic performance difference D is a mean value of the total sum of absolute values of the acoustic performance difference between the performance curve 84a and the performance curve 85 in the band L. This mean value is expressed by the following expression:

$$D = \frac{1}{N}\sum_{n=1}^{N} |\alpha_{85}(f_n) - \alpha_{84a}(f_n)| \qquad (1)$$

In this step, the acoustic performance difference calculation means 18 calculates 20 acoustic performance differences D described above.

In step S305, the order decision means 19 decides the order of the 20 material parameter values respectively corresponding to 20 performance curves 84 according to the magnitude of the maximum value of the 20 cross correlation functions, the parvitude of the 20 frequency differences H, and the parvitude of the 20 acoustic performance differences D.

In step S306, the order decision means 19 decides the value of the material parameter of the highest order. The contour map drawing means 13 changes the display position of the cursor 71 and the display 72 of the material parameter value according to this value. In addition, the plot drawing means 13 draws the performance curve 82 corresponding to the determined material parameter value on a plot. Then the processing ends.

According to the present embodiment, the comparison between the actual measured value of the acoustic performance of an actually existing acoustic material and the calculation value of the acoustic performance calculated based on a mathematical model can be executed by calculation instead of visual verification, and thereby it is enabled for the user to know a desirable value of the material parameter for the acoustic material which is to be calculated by the mathematical model. Some material parameters exist whose measurement is difficult according to their types. However, according to the present exemplary embodiment, it is enabled for the user to know a desirable value for the material parameters whose measurement is difficult. In other words, the user is allowed to know a specific value of the material parameter without a highly developed measurement technique for obtaining an actually measured value of the material parameter.

Figure 14:
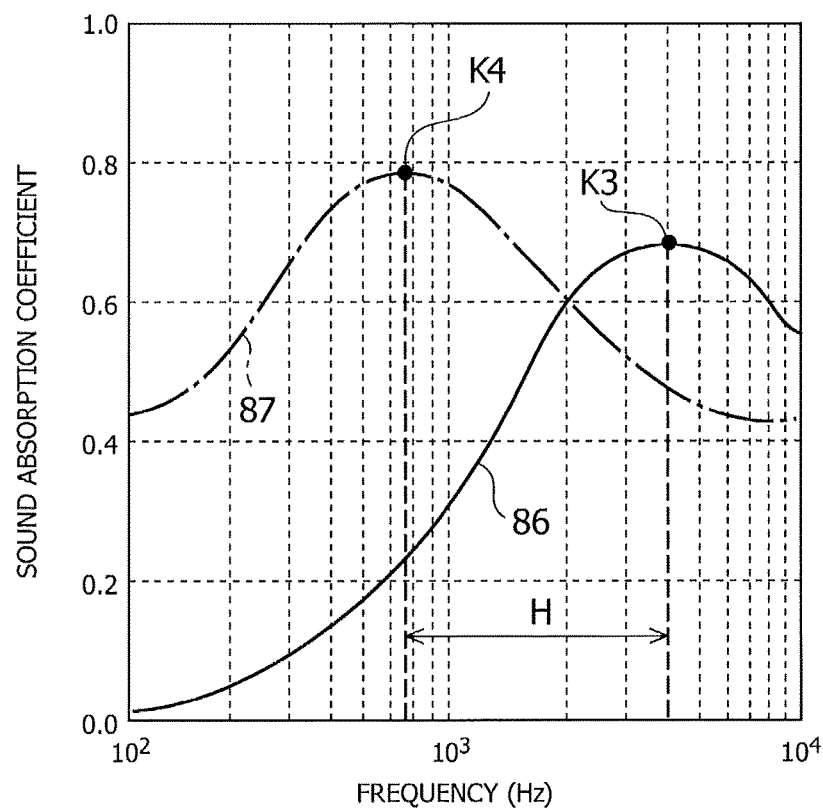
FIG. 14 is an explanatory drawing which illustrates another example of a frequency difference.

In another example of step S303, the frequency difference calculation means 17 can calculate another numerical value as the frequency difference. This example will be described with reference to FIG. 14, which is similar to FIG. 9. A mathematical model-based performance curve 86 and an actual measurement-based performance curve 87 are illustrated in FIG. 14. Both performance curves have a relatively simple shape. Further, the similarity of the shape between both performance curves can be considered to be high based on visual verification. An extreme point K3 exists on the mathematical model-based performance curve 86 and an extreme point K4 exists on the actual measurement-based performance curve 87. The frequency difference calculation means 17 can also calculate the absolute value of the above-described difference between the frequency at the extreme point K3 and the frequency at the extreme point K4 as the frequency difference H. As described above, if both performance curves have a relatively simple shape illustrated in FIG. 14 and the similarity between both performance curves is relatively high, then the calculation method for the frequency difference H can be simplified.

Note that in deciding the order of the material parameter values based on three components including the differences between the cross correlation function or the correlation coefficient and the frequency and the acoustic performance difference, the order decision means 19 can decide the order after assigning weights to one or more freely selected component.

Another Embodiment of Acoustic Performance Calculation Device

According to the above-described embodiment, the acoustic performance is calculated for each of the finite number of values (e.g., 100 values) selected from the numerical range for a specific material parameter and a material parameter value by which an acoustic performance close to the actual measurement value for comparison is determined from among the finite number of material parameter values. To paraphrase this, the above-described embodiment covers the finite number of values within the numerical range for the material parameter instead of covering the entire numerical range for the material parameter. However, it cannot be denied that any material parameter values other than the finite number of material parameter value described above may possibly exhibit an acoustic performance closer to the actual measurement value. Of course, the accuracy of the determination of the material parameter value can be increased to some extent by increasing the number of material parameter values selected from a narrowed-down numerical range for the material parameter. However, this configuration is not so efficient.

In the embodiment described below, the entire numerical range for the material parameter is covered. More specifically, the present embodiment takes a problem of determining a material parameter value with which an acoustic performance closer to the actual measurement value from the entire numerical range for the material parameter as an optimization problem and uses a method such as an "optimization method" to solve the optimization problem.

The optimization problem is generally one of fundamental problems that may occur in various fields, such as natural science, engineering, social science, and the like. More specifically, the optimization problem is a problem for minimizing or maximizing a specific function (this function is referred to as an "evaluation function" or an "objective function") under given conditions. As the optimization method for minimizing or maximizing the evaluation function, the simplex method and the steepest descent method are known. For details of such optimization method, refer to a Non-Patent Literature "Hiroshi Yabe, *New Mathematics in Engineering—Basic Engineering—Optimization and Its Application*, First Edition, March 2006, SUURIKOU-GAKU-SHA Co., Ltd.".

In the present embodiment, the evaluation function that uses a material parameter value as a variable and an initial value of the material parameter are determined and a material parameter value by which the evaluation function is maximized or minimized is calculated by the optimization method. The evaluation function is determined based on the relationship between the calculation value and the actual measurement value of the acoustic performance. With the above-described configuration, a material parameter value by which the acoustic performance closer to the actual measurement value, i.e., an optimum solution, can be determined. Accordingly, the accuracy of determination can be further increased.

As described above, the number of material parameters usually differs according to the mathematical model that is the base of determining the material parameter. In ordinary cases, a plurality of material parameters is used. It is considered difficult to optimize all the plurality of material parameters by the optimization method at a time. Considering this, in the present embodiment, the optimization methods are applied one by one to respective material parameters. However, in calculating the acoustic performance during the optimization of a specific material parameter, a specific value is required for the other material parameters.

On the other hand, different material parameters have different degrees of influence on the acoustic performance. As described above, in the Biot model, nine material parameters are used. Among them, the flow resistivity is considered to have a relatively high degree of influence on the acoustic performance of the acoustic material. In other words, the contribution of flow resistivity to the acoustic performance is considered to be relatively high. The contribution is a quantitative scale for evaluating whether each material parameter can control the acoustic performance of the acoustic material. Accordingly, in optimizing the material parameters one by one, the accuracy of determining the respective material parameter values is further increased by performing the optimization of the material parameters in order of higher contribution. In the present embodiment, the contribution of respective material parameters is calculated and the material parameters are subjected to the optimization one by one in order of higher contribution. The optimization is performed in order of higher contribution and one cycle is completed when all the material parameters are completely optimized. By repeating the cycle from a first cycle to a second cycle and then to a third cycle, the accuracy of the value of the material parameter is further increased.

Considering this, in the first cycle, in performing the optimization of a material parameter with the highest contribution, an initial value of the material parameter is determined by such a freely chosen method that it is determined based on a result of the user input. The values of the other material parameters required for the calculation of the acoustic performance are appropriately determined in a similar manner. By performing the optimization, an optimum solution for the material parameter with the highest contribution is obtained.

Similarly, next in the first cycle, the material parameter with the second highest contribution is optimized. In this process, an initial value of the material parameter to be optimized is appropriately determined based on a result of the user input or the like. Values of the other material parameters are appropriately determined in the similar manner. However, for the material parameter with the highest contribution for which an optimum solution has been obtained, the obtained optimum solution is used. With respect to material parameters for which their optimum solution have already been obtained so far, the optimum solution is used to optimize the material parameter to be optimized at the timing in the above-described manner. Material parameters with the third highest contribution and beyond are optimized in the similar manner. By completely performing the first cycle in the above-described manner, optimum solutions for all the material parameters are obtained.

In the subsequent second cycle, the cycle is also started from the optimization of the material parameter with the highest contribution. The optimum solution obtained by the first cycle is used for the initial value of the material parameter with the highest contribution. For the values of the other material parameters, the optimum solutions obtained in the first cycle are used. A more optimum solution for the material parameter with the highest contribution is obtained in the above-described manner. The optimum solution is more optimum than that obtained by the first cycle.

As described above, the term "optimum" herein means that a solution is most optimum among those obtained by a specific timing. That is, it does not necessarily mean that a solution is "the" absolutely optimum one. In other words, although an optimum solution is obtained by the first cycle, an optimum solution to be obtained by the second cycle is a more optimum solution.

Similarly, in the second cycle, in optimizing the material parameter with the second highest contribution, the optimum solution obtained in the first cycle is used as the initial value thereof. The optimum solution obtained in the first cycle is used for respective values of the other material parameters. However, for the material parameter with the highest contribution, for which the more accurate optimum solution has already been obtained, the optimum solution is used as the initial value. As described above, for the material parameter for which a more accurate optimum solution has been obtained so far, the optimum solution is used in optimizing the material parameter to be optimized at the timing. The material parameter with the third highest contribution is optimized in the similar manner. The third cycle and beyond are subjected to the optimization in the similar manner.

As described above, in any cycle, if any optimum solution that has been obtained so far exists, it is used as the initial value of the material parameter to be optimized and the value of the other material parameters.

Figure 15:
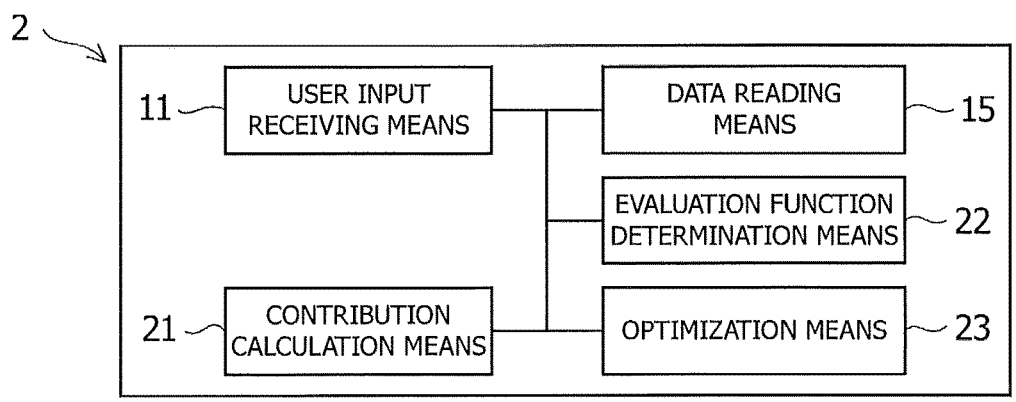
FIG. 15 is an explanatory drawing that illustrates an exemplary functional configuration of an acoustic performance calculation device according to another embodiment.

Now, the present embodiment will be more specifically described below with reference to the drawings. FIG. 15 illustrates an exemplary functional configuration of an acoustic performance calculation device 2 according to the present embodiment. The acoustic performance calculation device 2 includes a contribution calculation means 21, an evaluation function determination means 22, and an optimization means 23 in addition to the user input receiving means 11 and the data reading means 15 described above. The function of each of the contribution calculation means 21, the evaluation function determination means 22, and the optimization means 23 will be described in detail later below.

The hardware configuration of the acoustic performance calculation device 2 is similar to that illustrated in FIG. 3.

Figure 16:
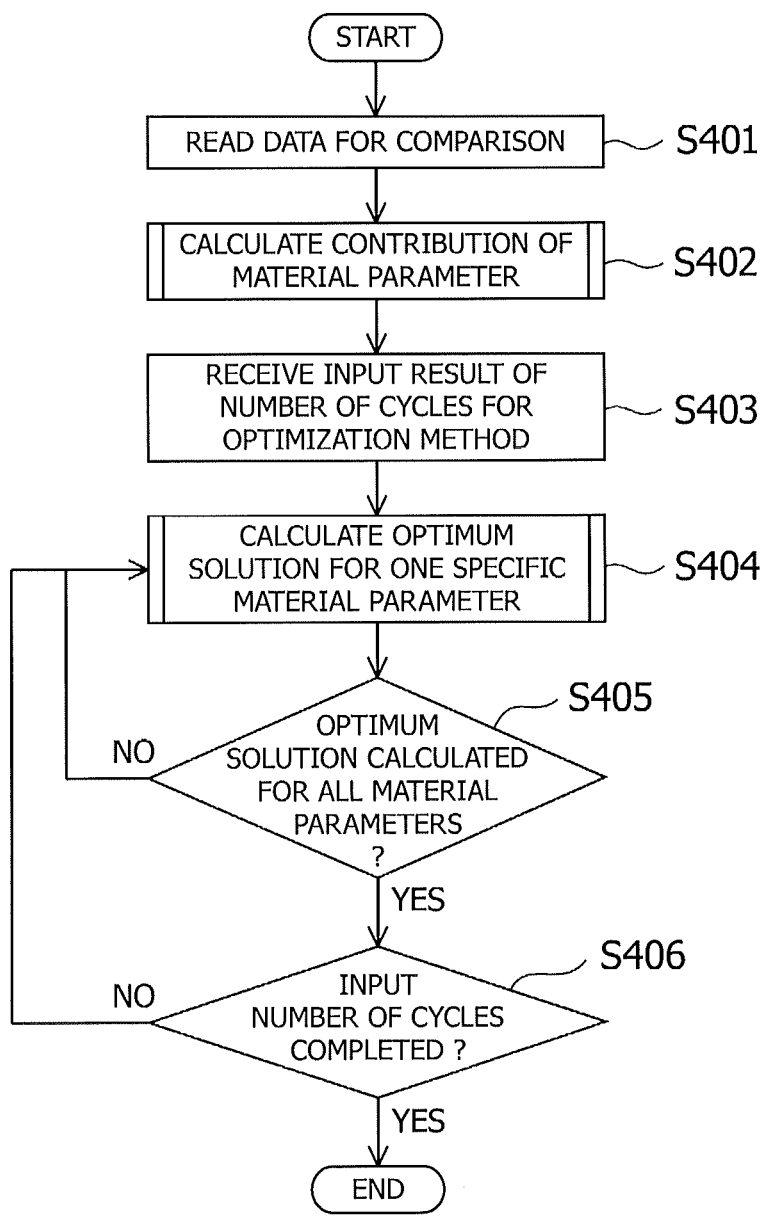
FIG. 16 is a flow chart of processing executed by the acoustic performance calculation device according to another embodiment.

A flow of processing executed by the acoustic performance calculation device 2 with the above-described configuration will be described in detail below with reference to FIGS. 16 to 19. Referring to FIG. 16, in step S401, the data reading means 15 reads the actual measurement data of the acoustic performance as data for comparison.

In step S402, the contribution calculation means 21 calculates the contribution of each material parameter that is necessary for the mathematical model selected by the user. As described above, the term "contribution" refers to a quantitative scale that represents the degree of influence of the material parameter on the acoustic performance of the acoustic material. The processing in this step will be described in detail later below with reference to FIGS. 17 and 18.

In the subsequent step S403, the user input receiving means 11 receives a result of the user input of the number of cycles for the optimization method. The cycle is determined in the above-described manner.

In step S404, an optimum solution for one specific material parameter V is calculated by the optimization method. This step is executed by the data reading means 15, the evaluation function determination means 22, and the optimization means 23. The processing in this step will be described below with reference to FIG. 19.

In step S405, the optimization means 23 determines whether an optimum solution has been obtained for all the material parameters. If the result of the determination is "NO", then the processing returns to step S404 described above. By repeating step S404 for each of the plurality of material parameters in the above-described manner, an optimum solution is obtained for all the material parameters. The material parameters are subjected to the optimization in step S404 one by one in order of higher contribution, which is determined by step S402. When the result of the determination in this step becomes "YES", then the processing advances to step S406 described below.

In step S406, the optimization means 23 counts the number of the completed cycles. More specifically, if this step is to be performed for the first time, the optimization means 23 counts the number of the completed cycles as "1", while if this step is to be performed for the second time, the optimization means 23 counts the number of the completed cycles as "2". The same applies to the third time and beyond of performing this step. Subsequently, the optimization means 23 determines whether the number of completed cycles has reached the number of cycles that has been received in step S403. If the result of the determination is "NO", then the processing returns to step S404. As described above, the optimization is executed for the number of cycles determined by the user. If the result of the processing in this step has become "YES", then the processing ends.

Figure 17:
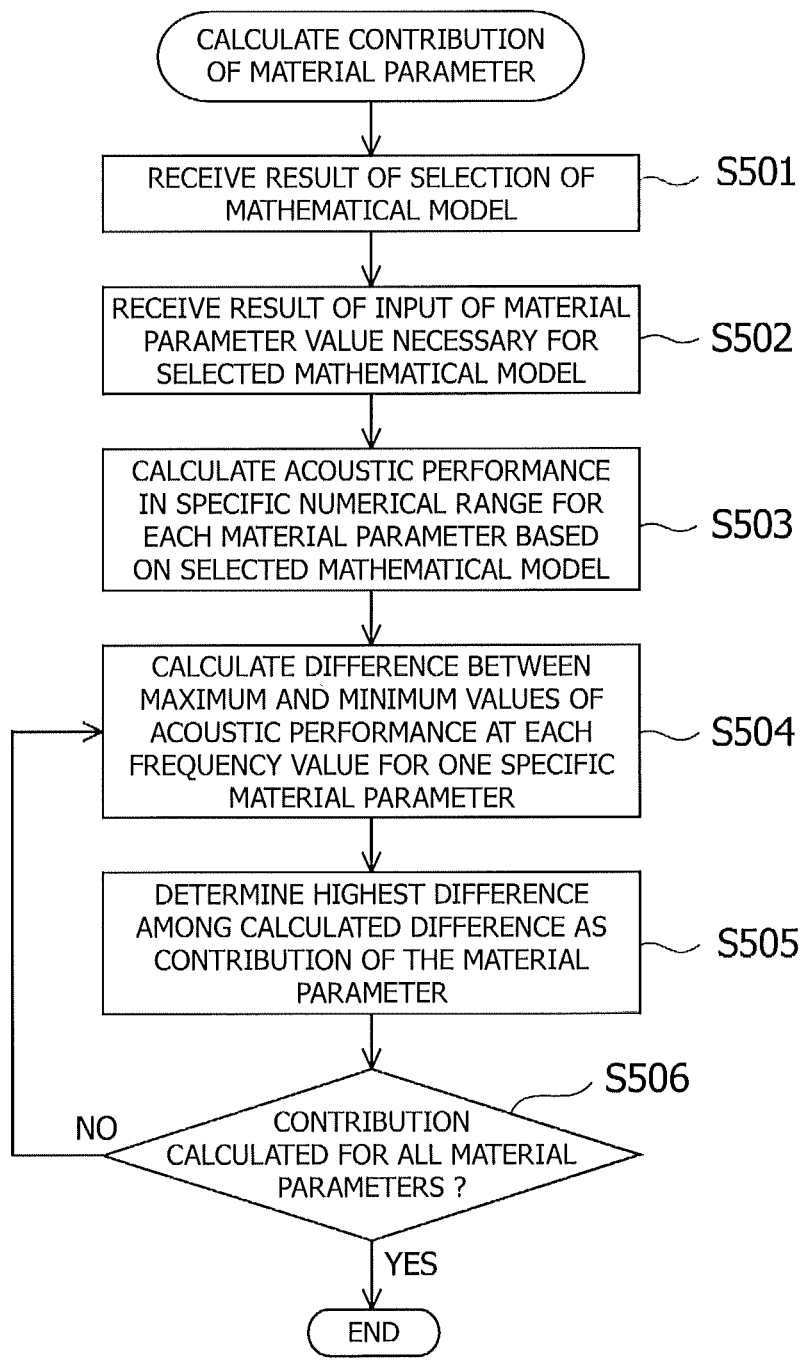
FIG. 17 is a flow chart of processing executed by the acoustic performance calculation device according to another embodiment.
Figure 18:
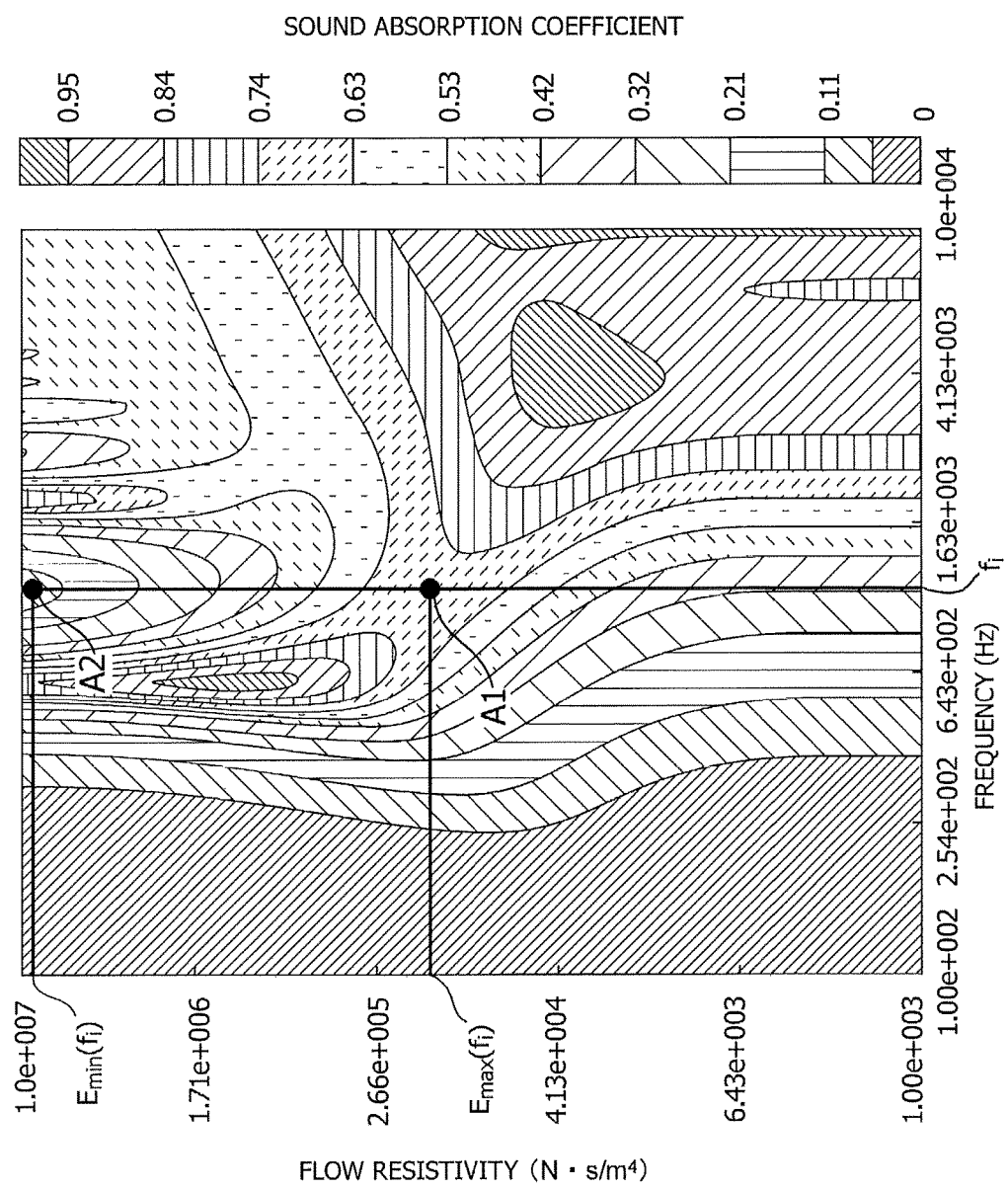
FIG. 18 illustrates another example of the contour map.

Processing for calculating the contribution in step S402 described above will be described in detail below with reference to FIG. 17 and FIG. 18. At the start of the processing, the user selects a mathematical model for the material for which the acoustic performance is to be calculated. In step S501, the user input receiving means 11 receives the result of the selection.

In step S502, the user temporarily determines the values of the material parameters necessary for the mathematical models selected in step S501 and the user input receiving means 11 receives the values input by the user.

In step S503, the contribution calculation means 21 selects $N_1$ values from the numerical range of "100.0 Hz to 1.0 e+004 Hz", for example, as the frequency value used in calculating the acoustic performance. For example, $N_1=100$. The above-described numerical range for the frequency and the value of $N_1$ are mere examples and are not limited thereto. Further, the contribution calculation means 21 determines the numerical range for one specific material parameter and selects a finite number of values, e.g., 100 values, from the numerical range. Furthermore, the contribution calculation means 21 calculates 100×100=10,000 values of the acoustic performance for the material parameter. In this step, values of the other material parameters for which the numerical range has not been determined are required. For these values, those received in step S502 are used. The calculation of 10,000 values of acoustic performance is performed for each material parameter.

The acoustic performance to be calculated may be either one or both of the sound absorption coefficient and the sound transmission loss. Of course, the above-described numbers, such as 100 and 10,000, are mere examples. The numerical range for the frequency and the frequency value selected from within the range and the numerical range for respective material parameters and the material parameter value selected from within the range can be freely determined by the contribution calculation means 21.

Then the processing advances to step S504. Processing in this step will be described below with reference to FIG. 18, FIG. 18 illustrates another example of the contour map illustrated in FIG. 5. In FIG. 18, the frequency is taken on the axis of the abscissa, the flow resistivity, which is one of the material parameters, is taken on the axis of the ordinate, and the sound absorption coefficient, which is one of the acoustic performances, is illustrated by contours. The frequency range taken on the axis of the abscissa and the numerical range of the flow resistivity taken on the axis of the ordinate have been determined by the contribution calculation means 21 in step S503. A sign A1 represents a point of highest sound absorption coefficient and a sign A2 represents a point of lowest sound absorption coefficient, both at a specific frequency value f1 selected in step S503. However, the subscript i is an integer of 1 or greater to $N_1$ or smaller. The value of the flow resistivity corresponding to the point A1 is $E_{max}(f_i)$. The value of the flow resistivity corresponding to the point A2 is $E_{min}(f_i)$. In this step, the contribution calculation means 21 calculates a difference $\Delta(f_i)$, which is a difference between the maximum value and the minimum value of the acoustic performance at each frequency value $f_i$ for one specific material parameter. The difference $\Delta(f_i)$ can be calculated by the following equation:

$$\Delta(f_i) = E_{max}(f_i) - E_{min}(f_i).$$

In step S505, the contribution calculation means 21 determines the difference $\Delta(f_i)$ which is the greatest among $N_1$ differences $\Delta(f_i)$ calculated in step S504 as the contribution of the material parameter. The high contribution means that the acoustic performance greatly varies at a specific frequency value when the value of the material parameter is changed. To paraphrase this, what value is set to the material parameter with a high contribution greatly influences the acoustic performance to be achieved.

In step S506, the contribution calculation means 21 determines whether the contribution has been calculated for all the material parameters. If the result of the determination is "NO" then the processing returns to step S504. The contribution of all the plurality of material parameters is calculated in the above-described manner. If the result of the processing in this step has become "YES", then the processing ends.

Figure 19:
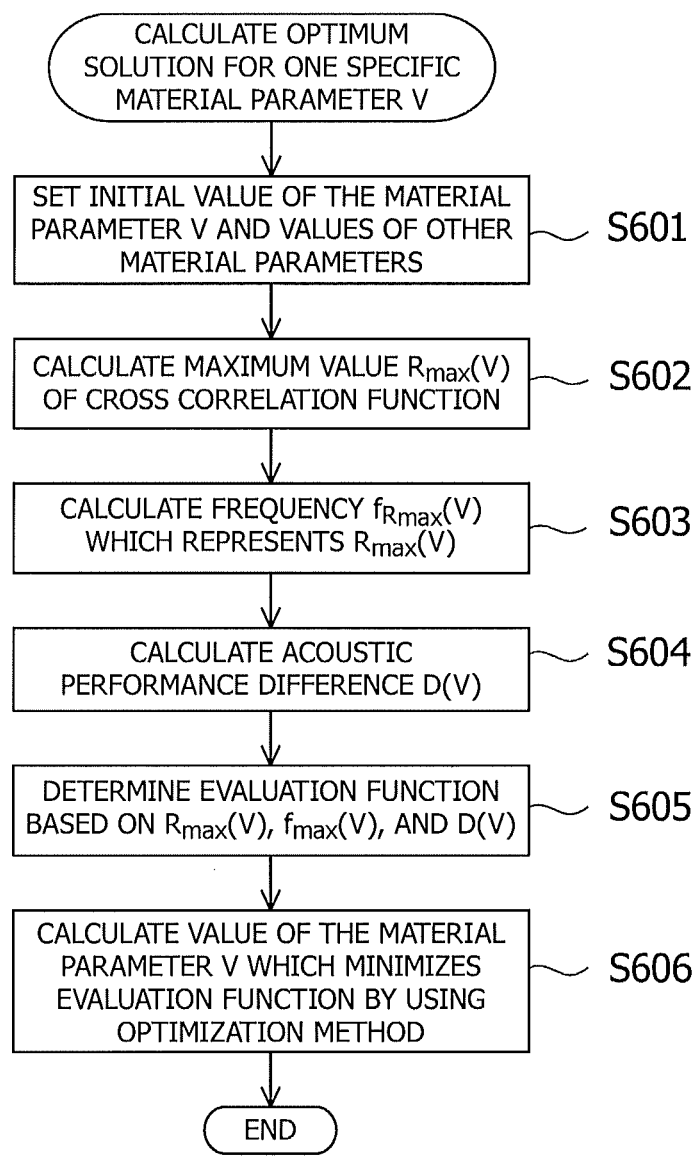
FIG. 19 is a flow chart of processing executed by the acoustic performance calculation device according to another embodiment.

Now, the optimization in step S404 described above will be described below with reference to FIG. 19. The processing illustrated in FIG. 19 is performed on one specific material parameter V. In the Biot model, the material parameter V is either one of the nine material parameters described above.

At first, in step S601, the optimization means 23 determines the initial value of the material parameter V to be optimized. The initial value may be the value received by the user input receiving means 11 or may be arbitrarily determined by the optimization means 23. Further, in this step, the optimization means 23 also determines the value of the respective material parameters other than the material parameter V. This is because although only one material parameter V is the subject of the optimization, the values or the material parameters other than the material parameter V are necessary in calculating the acoustic performance.

In step S602, the evaluation function determination means 22 calculates the acoustic performance based on the initial value of the material parameter V and the values of the other material parameters. Subsequently, the evaluation function determination means 22 calculates a cross correlation function R(V), which is a function of the calculation value of the acoustic performance and the actual measurement value of the acoustic performance read in step S401. An example of a curve of the cross correlation function R(V) is illustrated in FIG. 12. Then the evaluation function determination means 22 calculates a maximum value $R_{max}(V)$ of the cross correlation function R(V).

In step S603, the evaluation function determination means 22 calculates a value $f_{Rmax}(V)$ of the translation distance G in the direction of the frequency axis, which represents the maximum value $R_{max}(V)$ calculated in step S602.

In step S604, the evaluation function determination means 22 calculates a difference D (V) of the acoustic performance according to the following expression.

$$D(V) = \frac{1}{N_2} \sum_{j=1}^{N_2} \{E_{means}(f_j) - E_{calc}(f_j, V)\} \tag{2}$$

where $f_j$ represents a frequency value and j is an integer of 1 or greater and $N_2$ or smaller and $N_2$ is the number of the frequency values on the frequency axis. The variable $f_j$ is determined according to the actual measurement data read in step S401. $E_{meas}(f_j)$ is an actual measurement value of the acoustic performance in the frequency $f_j$. $E_{calc}(f_j, V)$ is a calculation value of the acoustic performance in the frequency $f_j$.

In step S605, the evaluation function determination means 22 determines an evaluation function $F_E(V)$ based on the maximum value $R_{max}(V)$ of the cross correlation function R(V), the frequency value $f_{Rmax}(V)$, and the acoustic performance difference D(V) calculated in the step described above. Two specific examples of the evaluation function $F_E(V)$ are described below:

$$F_E(V) = \{1 - R_{max}(V)\} \times \frac{f_{Rmax}(V)}{N_2} \times D(V) \tag{3}$$

$$F_E(V) = \frac{1}{R_{max}(V)} \times \left(\frac{f_{Rmax}(V)}{N_2}\right) \times D(V). \tag{4}$$

In step S606, a value of the material parameter V with which the evaluation function $F_E(V)$, which has been determined in step S605, becomes maximum is calculated by using an arbitrary optimization method. The optimization means 23 can determine which optimization method is to be used. By using the optimization method as described above, the entire numerical range determined for the material parameter V is covered and a specific value existing within the numerical range is obtained as the optimum solution.

With respect to FIG. 16, if nine material parameters exist and the number of cycles for the optimization method is two, steps S404 and S405 are repeated nine times in both the first cycle and the second cycle. Then the result of the determination in step S406 becomes "YES" and then the processing ends.

According to the present embodiment, which uses the optimization method, the entire numerical range for the material parameter is covered and a material parameter value by which the acoustic performance closer to the actually measured acoustic performance can be determined according to the entire numerical range. Furthermore, because the material parameters are optimized one by one according to the contribution of each of the plurality of material parameters, the accuracy in determining the material parameter value can be increased. In addition, because the number of cycles for optimization can be appropriately set, the accuracy in determining the material parameter value further increases.

[Other Configuration]

In the processing I executed by the above-described acoustic performance calculation device, it is sufficient if the acoustic performance calculation device 1 illustrated in FIG. 2 includes the user input receiving means 11, the acoustic performance calculation means 12, the contour map drawing means 13, and the plot drawing means 14, i.e., other means are not required.

In the processing II executed by the above-described acoustic performance calculation device, it is sufficient if the acoustic performance calculation device 1 illustrated in FIG. 2 includes the user input receiving means 11, the acoustic performance calculation means 12, the contour map drawing means 13, the plot drawing means 14, and the data reading means 15, i.e., other means are not required.

In the examples of the contour map illustrated in FIGS. 5 and 8, the hue gradually changes from red-based colors to blue-based colors as the acoustic performance decreases from 1.00 to 0.00. However, the color can be changed in any other different manner. The same applies to FIG. 18.

In FIG. 19, it is not required to perform all the three steps including steps S602 to S604. For example, only step S602 among them can be performed and a function "$F_E(V)=1-R_{max}(V)$" or "$F_E(V)=1/R_{max}(V)$" can be determined as the evaluation function in step S605. As described above, the total computational complexity can be reduced while maintaining a sufficient level of the accuracy in determining the material parameter.

In FIG. 19, the optimization problem of minimizing the evaluation function determined in step S605 in step S606 is solved by the optimization method. However, the present embodiment is not limited to this. More specifically, an evaluation function of another format can be determined in step S605 and the optimization problem of maximizing the determined evaluation function in step S606 can be solved by the optimization method.

In FIG. 15, the contribution calculation means 21 is not always required. In this case, steps S502 to S506 in FIG. 17 are not executed and the optimization in step S404 is executed on each of the plurality of material parameters in a specific order. The order is freely determined by the optimization means 23. As described above, the total computational complexity can be reduced while maintaining a sufficient level of the accuracy in determining the material parameter.

Similarly to the acoustic performance calculation device 1 illustrated in FIG. 2, the acoustic performance calculation device 2 illustrated in FIG. 15 can further include the contour map drawing means 13 and the plot drawing means 14. In this case, the contour map drawing means 13 is connected with the contribution calculation means 21 provided within the acoustic performance calculation device 2. The plot drawing means 14 is connected with the contribution calculation means 21 and the data reading means 15 similarly provided within the acoustic performance calculation device 2. With the above-described configuration, the contour map drawing means 13 receives an instruction input by the user input receiving means 11 and draws a contour map based on the result of output from the contribution calculation means 21. The plot drawing means 14 draws a plot based on the result of output from the contribution calculation means 21 and a result of output from the data reading means 15.

The functional configuration and the physical configuration of the acoustic performance calculation devices described above are not limited to those described in the above-described embodiments. For example, the functions and the physical resources can be integrally implemented or implemented conversely in a distributed manner.

REFERENCE SIGNS LIST 1,2 Acoustic performance calculation device
11 User input receiving means
12 Acoustic performance calculation means
13 Contour map drawing means
14 Plot drawing means
15 Data reading means
16 Correlation relationship calculation means
17 Frequency difference calculation means
18 Acoustic performance difference calculation means
19 Order decision means
21 Contribution calculation means
22 Evaluation function determination means
23 Optimization means
51 CPU
52 Interface device
53 Display device
54 Input device
55 Drive device
56 Auxiliary storage device
57 Memory device
58 Bus
59 Recording medium
71 Cursor
72 Display of material parameter value
73 Slider
81 to 87 Performance curves
84a Translated performance curve
91 Cross correlation function
P Acoustic material
F Frame
A Air
S1 Sound incident to acoustic material
S2 Air-borne sound
S3 Structure borne sound
L1 Viscous loss
L2 Heat exchange loss
L3 Internal loss
M Interaction A1, A2, K1 to K4, J1, J2 Points
G Translation distance
H Frequency difference
L Frequency band
D Acoustic performance difference

The invention claimed is:

1. An acoustic performance calculation device comprising:
a processor configured to:
calculate acoustic performances of an acoustic material for each of a plurality of values existing within a pre-specified numerical range for one type of material parameter among a plurality of material parameters characterizing the acoustic material based on a mathematical model for mathematically representing the acoustic material;
draw a contour map, which represents the calculated acoustic performance by contours with different colors differing according to values of the acoustic performance by using the values of the one type of material parameter and a frequency as values taken on two axes, and configured to draw, on the contour map, a straight line-shaped cursor parallel to a frequency axis of the contour map and a display of the value of the one type of material parameter indicated by the cursor; and
draw performance curves which represent a relationship between the frequency and the acoustic performance for one value within the numerical range on a plot,
wherein the processor is configured to receive a user input to change a position of display of the cursor on the contour map and a display of the value of the one type of material parameter according to the user input,
wherein the performance curves are drawn corresponding to the display of the changed value of the one type of material parameter on the plot.

2. The acoustic performance calculation device according to claim 1, wherein the processor is configured to:
read data related to the acoustic performance as data for comparison, and
also draw performance curves for the read data for comparison on the plot.

3. The acoustic performance calculation device according to claim 2, wherein the processor is configured to:
calculate correlation relationships between each of the plurality of calculated acoustic performances and the data for comparison;
calculate a frequency difference between the performance curve corresponding to each of the plurality of calculated acoustic performances and the performance curve for the data for comparison based on the plurality of calculated correlation relationships;
calculate differences between an acoustic performance, which is represented by a performance curve obtained by translating a performance curve corresponding to each of the plurality of calculated acoustic performances by an amount equivalent to the frequency difference in a direction of the frequency axis, and an acoustic performance represented by a performance curve for the data for comparison to calculate a mean value of a total sum of absolute values of the differences as an acoustic performance difference; and
decide orders of a plurality of values of the material parameters corresponding to each of the plurality of calculated acoustic performances according to the plurality of calculated correlation relationships, the plurality of calculated frequency differences, and the plurality of calculated acoustic performance differences.

4. An acoustic performance calculation method executed by a processor, the method comprising:
calculating acoustic performances of an acoustic material for each of a plurality of values existing within a pre-specified numerical range for one type of material parameter among a plurality of material parameters characterizing the acoustic material based on a mathematical model for mathematically representing the acoustic material;
drawing a contour map, which represents the calculated acoustic performance by contours with different colors differing according to values of the acoustic performance by using the values of the one type of material parameter and a frequency as values taken on two axes, and drawing, on the contour map, a straight line-shaped cursor parallel to a frequency axis of the contour map and a display of the value of the one type of material parameter indicated by the cursor;
drawing performance curves which represent a relationship between the frequency and the acoustic performance for one value within the numerical range on a plot;
changing a position of display of the cursor on the contour map and a display of the value of the one type of material parameter according to a user input; and
drawing performance curves corresponding to the display of the changed value of the one type of material parameter on the plot.

5. The acoustic performance calculation method according to claim 4, wherein the processor is configured to read data related to the acoustic performance as data for comparison, the method further comprising drawing performance curves for the read data for comparison on the plot.

6. The acoustic performance calculation method according to claim 5, the method further comprising:
calculating correlation relationships between each of the plurality of calculated acoustic performances and the data for comparison;
calculating a frequency difference between the performance curve corresponding to each of the plurality of calculated acoustic performances and the performance curve for the data for comparison based on the plurality of calculated correlation relationships;
calculating differences between an acoustic performance, which is represented by a performance curve obtained by translating a performance curve corresponding to each of the plurality of calculated acoustic performances by an amount equivalent to the frequency difference in a direction of the frequency axis, and an acoustic performance represented by a performance curve for the data for comparison, and calculating a mean value of a total sum of absolute values of the differences as an acoustic performance difference; and
deciding orders of a plurality of values of the material parameters corresponding to each of the plurality of calculated acoustic performances according to the plurality of calculated correlation relationships, the plurality of calculated frequency differences, and the plurality of calculated acoustic performance differences.

7. A nontransitory computer readable medium encoded with an acoustic performance calculation program including instructions which, when executed by an acoustic performance calculation device, cause the acoustic performance calculation device to perform operations comprising:
calculating acoustic performances of an acoustic material for each of a plurality of values existing within a pre-specified numerical range for one type of material parameter among a plurality of material parameters characterizing the acoustic material based on a mathematical model for mathematically representing the acoustic material;

drawing a contour map, which represents the calculated acoustic performance by contours with different colors differing according to values of the acoustic performance by using the values of the one type of material parameter and a frequency as values taken on two axes, and drawing, on the contour map, a straight line-shaped cursor parallel to a frequency axis of the contour map and a display of the value of the one type of material parameter indicated by the cursor;

drawing performance curves which represent a relationship between the frequency and the acoustic performance for one value within the numerical range on a plot;

changing a position of display of the cursor on the contour map and a display of the value of the one type of material parameter according to a user input; and drawing performance curves corresponding to the display of the changed value of the one type of material parameter on the plot.

8. The nontransitory computer readable medium according to claim 7, the program further including instructions which, when executed by the acoustic performance calculation device, cause the acoustic performance calculation device to perform operations comprising reading data related to the acoustic performance as data for comparison and drawing performance curves for the read data for comparison on the plot.

9. The nontransitory computer readable medium according to claim 8, the program further including instructions which, when executed by the acoustic performance calculation device, cause the acoustic performance calculation device to perform operations comprising:

calculating correlation relationships between each of the plurality of calculated acoustic performances and the data for comparison;

calculating a frequency difference between the performance curve corresponding to each of the plurality of calculated acoustic performances and the performance curve for the data for comparison based on the plurality of calculated correlation relationships;

calculating differences between an acoustic performance, which is represented by a performance curve obtained by translating a performance curve corresponding to each of the plurality of calculated acoustic performances by an amount equivalent to the frequency difference in a direction of the frequency axis, and an acoustic performance represented by a performance curve for the data for comparison, and calculating a mean value of a total sum of absolute values of the differences as an acoustic performance difference; and deciding orders of a plurality of values of the material parameters corresponding to each of the plurality of calculated acoustic performances according to the plurality of calculated correlation relationships, the plurality of calculated frequency differences, and the plurality of calculated acoustic performance differences.

10. An acoustic performance calculation device comprising:

a processor configured to:

calculate acoustic performances of an acoustic material based on respective values of a plurality of material parameters characterizing the acoustic material based on a mathematical model which mathematically represents the acoustic material and determine an evaluation function by which one specific selected material parameter is to be optimized, based on a relationship between the calculated acoustic performances and another acoustic performance for comparison; and calculate an optimum solution for the one specific selected material parameter by solving an optimization problem for minimizing or maximizing the determined evaluation function by using a specific optimization method, wherein determination of the evaluation function and calculation of optimum solutions are executed for each of the plurality of material parameters, wherein the processor is configured to calculate a cross correlation function of the calculated acoustic performance and another acoustic performance for comparison, configured to calculate acoustic performance differences between the calculated acoustic performance and another acoustic performances for comparison, and configured to determine the evaluation function based on the cross correlation function and the acoustic performance differences.

11. The acoustic performance calculation device according to claim 10, wherein the processor is configured to calculate a contribution, which is a scale of an influence on the acoustic performance of the acoustic material for each of the plurality of material parameters, wherein determination of the evaluation function and calculation of the optimum solution are executed in order of higher contribution of the plurality of material parameters.

12. An acoustic performance calculation method comprising executing the following steps on each of a plurality of material parameters characterizing an acoustic material:

an evaluation function determination step of calculating acoustic performances of the acoustic material based on respective values of the plurality of material parameters based on a mathematical model which mathematically represents the acoustic material and of determining an evaluation function by which one specific selected material parameter is to be optimized, based on a relationship between the calculated acoustic performances and another acoustic performance for comparison; and an optimization step of calculating an optimum solution for the one specific selected material parameter by solving an optimization problem for minimizing or maximizing the evaluation function determined by the evaluation function determination step by using a specific optimization method, wherein the evaluation function determination step comprises calculating a cross correlation function of the calculated acoustic performance and another acoustic performance for comparison, calculating acoustic performance differences between the calculated acoustic performance and another acoustic performances for comparison, and determining the evaluation function based on the cross correlation function and the acoustic performance differences.

13. The acoustic performance calculation method according to claim 12, further comprising a contribution calculation step of calculating a contribution, which is a scale of an influence on the acoustic performance of the acoustic material for each of the plurality of material parameters, wherein the evaluation function determination step and the optimization step are executed in order of higher contribution of the plurality of material parameters.

14. A nontransitory computer readable medium encoded with an acoustic performance calculation program including instructions which, when executed by an acoustic performance calculation device, cause the acoustic performance calculation device to perform executing the following steps on each of a plurality of material parameters characterizing an acoustic material:
- an evaluation function determination step of calculating acoustic performances of the acoustic material based on respective values of a plurality of material parameters based on a mathematical model which mathematically represents the acoustic material and of determining an evaluation function by which one specific selected material parameter is to be optimized, based on a relationship between the calculated acoustic performances and another acoustic performance for comparison; and
- an optimization step of calculating an optimum solution for the one specific selected material parameter by solving an optimization problem for minimizing or maximizing the evaluation function determined by the evaluation function determination step by using a specific optimization method, wherein the evaluation function determination step comprises calculating a cross correlation function of the calculated acoustic performance and another acoustic performance for comparison, calculating acoustic performance differences between the calculated acoustic performance and another acoustic performances for comparison, and determining the evaluation function based on the cross correlation function and the acoustic performance differences.

15. The nontransitory computer readable medium according to claim 14, the program further including instructions which, when executed by an acoustic performance calculation device, cause the acoustic performance calculation device to perform operations comprising a contribution calculation step of calculating a contribution, which is a scale of an influence on the acoustic performance of the acoustic material for each of the plurality of material parameters, wherein the evaluation function determination step and the optimization step are executed in order of higher contribution of the plurality of material parameters.

* * * * *

UNITED STATES PATENT AND TRADEMARK OFFICE
CERTIFICATE OF CORRECTION

| | | |
|---|---|---|
| PATENT NO. | : 10,319,121 B2 | Page 1 of 1 |
| APPLICATION NO. | : 14/361931 | |
| DATED | : June 11, 2019 | |
| INVENTOR(S) | : Kunikazu Hirosawa | |

It is certified that error appears in the above-identified patent and that said Letters Patent is hereby corrected as shown below:

On the Title Page

"(71) NITTOBO ACOUSTIC ENGINEERING CO., LTD."
Should read:
--(71) to "NIHON ONKYO ENGINEERING CO., LTD.--

"(73) NITTOBO ACOUSTIC ENGINEERING CO., LTD."
Should read:
--(73) NIHON ONKYO ENGINEERING CO., LTD.--

Signed and Sealed this
Seventeenth Day of March, 2020

Andrei Iancu
*Director of the United States Patent and Trademark Office*